US005303375A

United States Patent [19]
Collins et al.

[11] Patent Number: 5,303,375
[45] Date of Patent: Apr. 12, 1994

[54] SYSTEM AND METHOD FOR FACILITATING SELECTION OF RUNNING FUNCTIONAL PROCESS IN OBJECT-ORIENTED ENVIRONMENTS

[75] Inventors: Timothy Collins, Concord, Mass.; Kevin G. Ewert, Fremont, Calif.; M. Colin Gerety, Ft. Collins, Colo.; Jon Gustafson, San Jose, Calif.; Ian Thomas, Mountain View, Calif.

[73] Assignee: Hewlett-Packard Company, Palo Alto, Calif.

[21] Appl. No.: 691,926

[22] Filed: Apr. 26, 1991

[51] Int. Cl.[5] .................... G06F 15/16; G06F 9/40
[52] U.S. Cl. ........................... 395/650; 364/DIG. 1; 364/281.3; 395/200; 395/600; 395/725; 395/700
[58] Field of Search .............. 395/650, 700, 725, 200, 395/600; 364/281.3, DIG. 1

[56] References Cited

U.S. PATENT DOCUMENTS

| | | | |
|---|---|---|---|
| 4,584,639 | 4/1986 | Hardy | 395/650 |
| 5,095,522 | 3/1992 | Fujita et al. | 395/200 |
| 5,109,515 | 4/1992 | Laggis et al. | 395/725 |
| 5,175,854 | 12/1992 | Cheung et al. | 395/650 |
| 5,187,787 | 2/1993 | Skeen et al. | 395/600 |
| 5,212,790 | 5/1993 | Ohler et al. | 395/650 |

OTHER PUBLICATIONS

"Distributed Object Management Facility Core Specification", pp. 1–65, Apr. 1991.
"Portable Common Tool Environment (PCTE) Abstract Specification", *European Computer Manufacturers* Association, pp. 1–27, Jan. 1991.
Mahler et al., "Integrating Configuration Management into a Generic Environment", *Proceedings of the Fourth ACM SIGSOFT Symposium on Software Development Environments*, Dec. 1990, pp. 229–237.
Ambriola, et al., "Software Process Enactment in Oikos", *Proceedings of the Fourth ACM SIGSOFT Symposium on Software Development Environments*, Dec. 1990, pp. 183–192.
Belz, et al., "A New Approach to Prototyping Ada-Based Hardware/Software Systems", *Proceedings of the ACM SIGADA Tri-Ada '90*, Dec. 3–6, 1990.
Hare, et al. (editors) "Inter-tool Communication Architecture" (Draft Proposal), version 0.5 Oct. 22, 1990.
Reiss, "Connecting Tools Using Message Passing in the Field Environment", *IEEE Software*, Jul. 1990, pp. 57–66.
Cagan, "The HP SoftBench Environment: An Architecture for a New Generation of Software Tools", *Hewlett-Packard Journal*, Jun. 1990, pp. 36–47.
Nanard, et al., "An Object-Oriented Kernal for Dynamical Software Integration", *Processings of the 1st International Conference on Systems Integration*, Apr. 1990, pp. 584–591.
ANSI, X3H4 Working Draft-Information Resource Dictionary System (ATIS). Feb. 1990.
Taylor, et al., "Foundations for the Arcadia Environment Architecture", *Proceedings of the ACM SIGSOFT-/SIGPlAN Software Engineering Symposium on Practical Software Development Environments*, Nov. 1988, pp. 1–13.
Ahuja, "Common Communications Support in Systems Application Architecture", *IBM Systems Journal*, vol. 27, No. 3, 1988, pp. 264–280.
Boudier, et al., "An Overview of PCTE and PCTE+", Nov. 1988, pp. 248–257.
Bennett, "The Design and Implementation of Distributed Smalltalk", *Hoopsla's '87 Proceedings*, Oct. 1987, pp. 318–330.

*Primary Examiner*—Gareth D. Shaw
*Assistant Examiner*—A. Katbab

[57] ABSTRACT

A system and method for selecting appropriate running functional processes within an object-oriented environment, based upon specified criteria. The selection is made based upon criteria required by the running functional processes and the nature and requirements of the requesting functional process. The present invention allows for these characteristics of the functional processes to be contained in the operation request, so that it is not necessary to obtain them from a common depository.

6 Claims, 20 Drawing Sheets

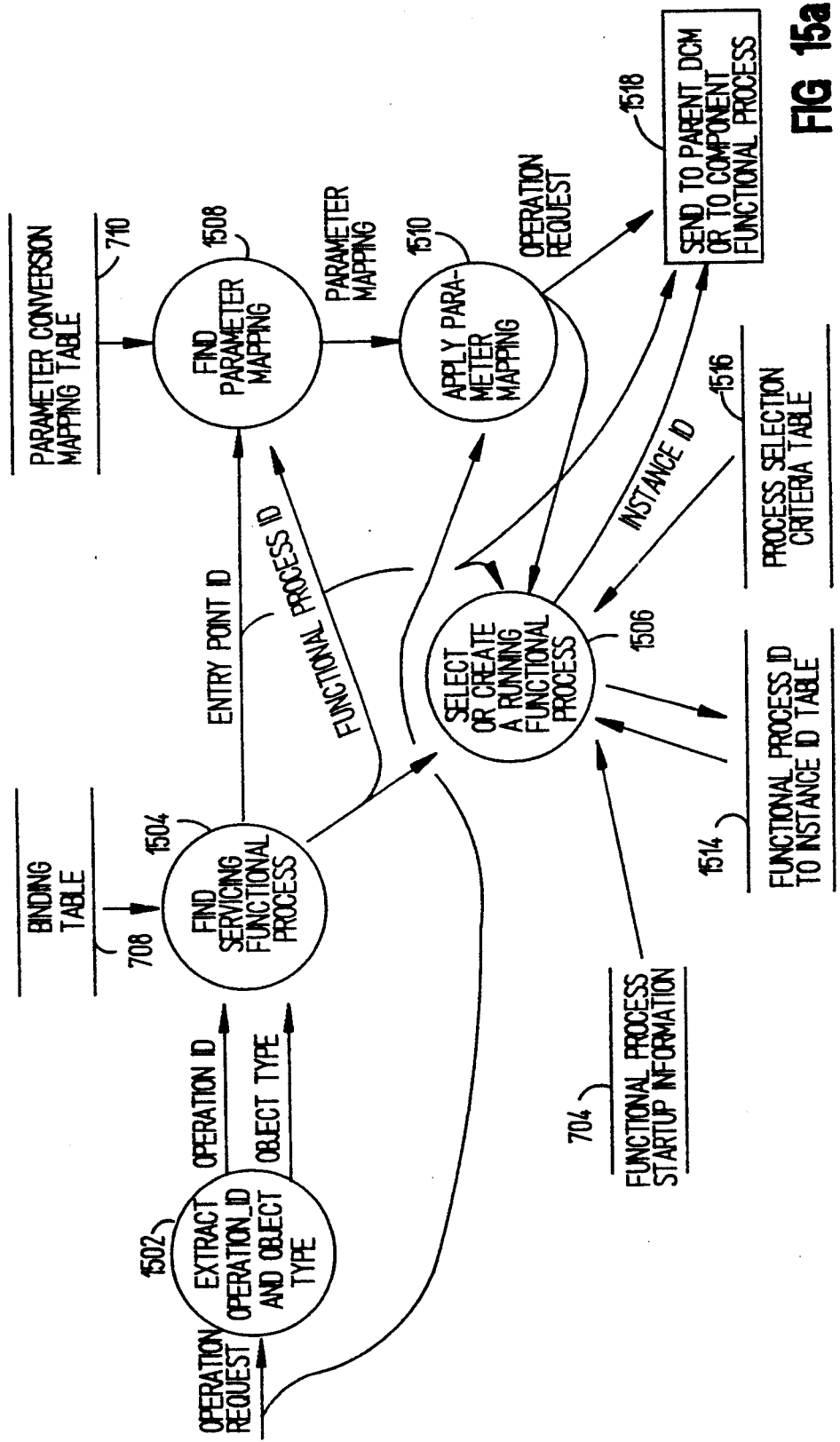

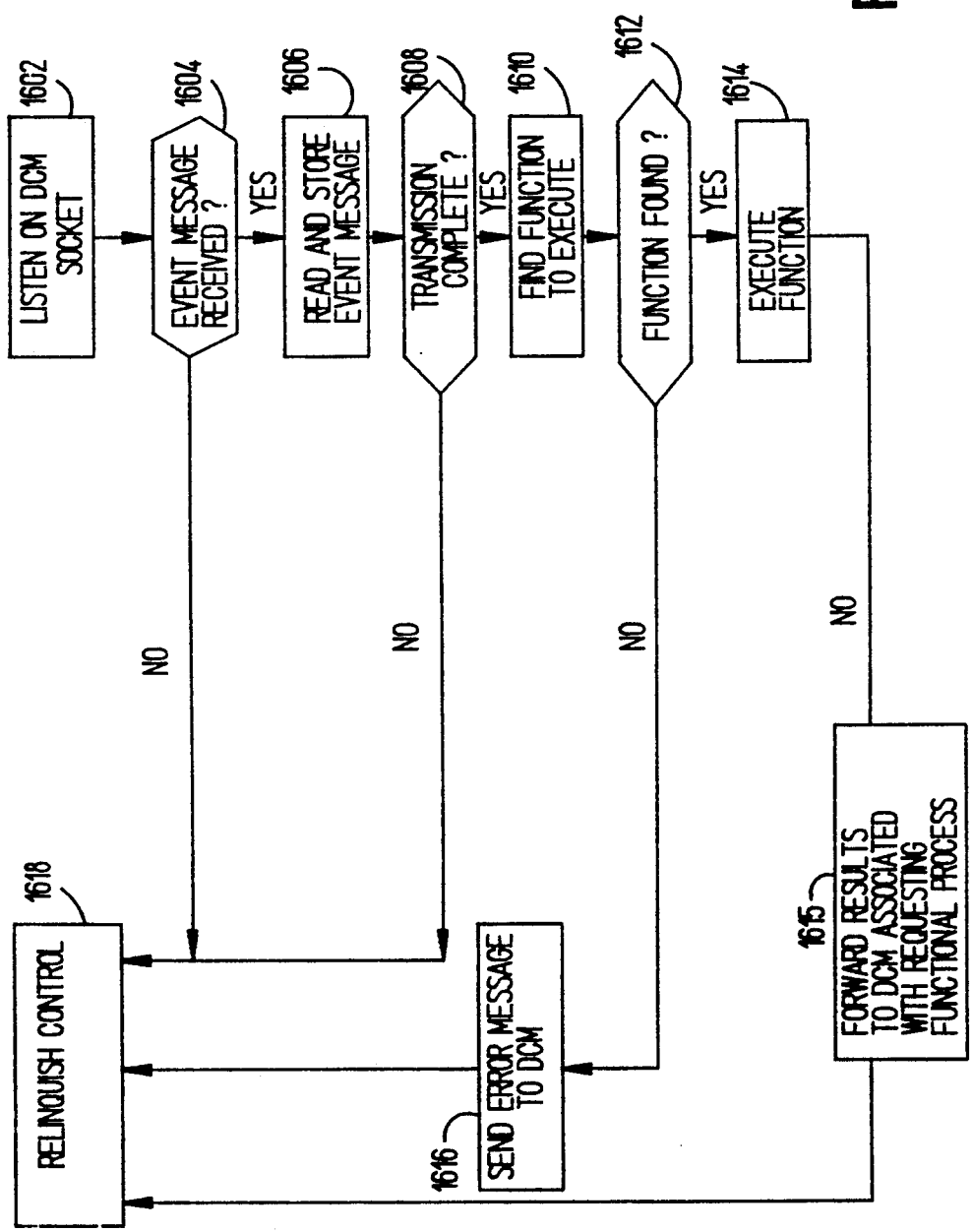

SYSTEM AND METHOD FOR FACILITATING SELECTION OF RUNNING FUNCTIONAL PROCESS IN OBJECT-ORIENTED ENVIRONMENTS

CROSS REFERENCE TO OTHER INVENTIONS

The following co-pending applications are commonly assigned, have been concurrently filed, and contain some common disclosure with that of the present application: SYSTEM AND METHOD FOR FACILITATING COMMUNICATION AMONG FUNCTIONAL PROCESSES AND SOFTWARE ENVIRONMENTS IN AN OBJECT-ORIENTED ENVIRONMENT (Ser. No. 07/692,092).

BACKGROUND OF THE INVENTION

I. Field of the Invention

The present invention is a system and method for selecting running functional processes within an object-oriented environment, based upon specified criteria. More specifically, the present invention relates to a system and method for selecting running functional processes to service an operation request, such that information which relates to the requesting functional process and which is used to make the determination for selecting the running functional process is available from the operation request.

II. Related Art

The importance of allowing different types of computer programs or "functional processes" to interact with one another has been appreciated for many years. For example, programs such as Symphony from the Lotus Corporation have been developed which combine functional processes which were traditionally implemented separately. Specifically, Symphony provides a spreadsheet, database, word processor and communications facility. Information generated from one functional process in Symphony can be transported and used by other functional processes. This allows the user a degree of flexibility not easily attainable using separate, non-communicative programs.

However, all-in-one programs such as Symphony suffer from various deficiencies. For example, a user may not like the word processor used in the all-in-one program, and may instead prefer to use another type of word processor. In addition, there may be tasks that the user would want to accomplish that are not supported by the all-in-one program. Thus, it was desirable to allow individual, independently designed functional processes to communicate with one another in a way that allows interchangeability of these processes.

One scheme which facilitates functional process interaction was implemented in the UNIX operating system. UNIX provided what is known as a "pipe" facility, which allows the output of a functional process to be received by the input of another functional process. In this way, data is "piped" from one functional process to another.

Such piping facilities as discussed above, however, also suffer from various deficiencies. For example, these facilities are not interactive. They do not allow the receiving functional process to send messages back to the sending functional process, and are thus limited in their flexibility. In addition, functional process are not permitted to easily interact in distributed environments such as local area networks.

Accordingly, schemes have been created which allow otherwise separate functional process to interactively communicate with each other, and which also allow for communication in a distributed system. These schemes form what can be described as an "environment," in which individual functional processes are accessible to all the other functional processes. Examples of such schemes are "SoftBench," "New Wave Office" and "ACTIS," all from Hewlett-Packard of Palo Alto, California, "Portable Common Tools Environment" (PCTE) developed by the European Computer Manufacturers Association, "A Tools Integration Standard" (ATIS) from Digital Equipment Corp. of Maynard, Mass. and Software Backplane from Atherton of Sunnyvale Calif.

Recently, there has been a move to object-oriented models for organizing data and operations on that data. An object oriented model is one which supports data abstraction. This means that data types are explicitly described in terms of the operations and attributes they support. In addition, the concept of inheritance is also used so that commonality between data types can be expressed.

Data abstraction implies the separation of the description of the data type from the implementation of the data type. Objects are used by requesting an operation on an instance of the abstract data type. For example, an abstract data type might be a "document" readable by a word processor. There must be some support in the object-oriented system for binding an abstract operation request (such as "delete paragraph") to a specific implementation, or method, for the operation.

This binding varies a great deal from environment to environment. For example, in most object oriented languages, like Smalltalk, each instance of an object contains pointers to the functions which implement its methods. When an operation is invoked, the operation request is used to find the pointer contained in the object (or data structure associated with its type) and control is passed to that function.

This language-based approach has been used in many environments which span functional processes, for example, ATIS. In order to invoke an operation on an object or obtain an attribute from it, the object-oriented system must access the data for the object itself.

A disadvantage of this approach is that the object-oriented system must be capable of finding and accessing the object data. In software development environments the data objects are stored in many locations and formats, and the implementation of the objects change over time. If the object-oriented system must access this data to find the method for an operation, either to object data must be placed in a common data repository, or the implementation of the environment must be modified to accommodate each new form of data storage.

SUMMARY OF THE INVENTION

The present invention overcomes the deficiencies of the previous devices by providing a system and method for invoking operations on an object in an object-oriented environment without having to obtain object data (i.e., data relevant to an object at issue) from a common data repository. This is done by implementing a mechanism where the necessary data to invoke an operation is located in the operation request itself. In this way, information such as the object type as well as parameters relevant to the operation can be immediately accessed. This is particularly advantageous so that the object type can be used easily as a basis for properly invoking instances of functional processes.

In addition, embodiments of the present invention can specifically use the object type as a basis for dispatching operations and that this information can be contained in each operation request so the type is immediately known to the environment. Also, it is contemplated that inheritance of implementations be allowed. That is, when a method (i.e. some functionality of a given functional process) is associated with an operation on a given object type, the same method will be used on all sub-types of that object type unless the sub-type has been specifically assigned a different implementation.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which:

FIG. 15a is a data flow diagram for forwarding an operation request to a servicing functional process.

FIG. 16 is a flow diagram showing the action a functional process takes upon receipt of an event message as contemplated by embodiments of the present invention.

DETAILED DESCRIPTION OF THE PREFERRED EMBODIMENTS

I. Overview

Figure 1:
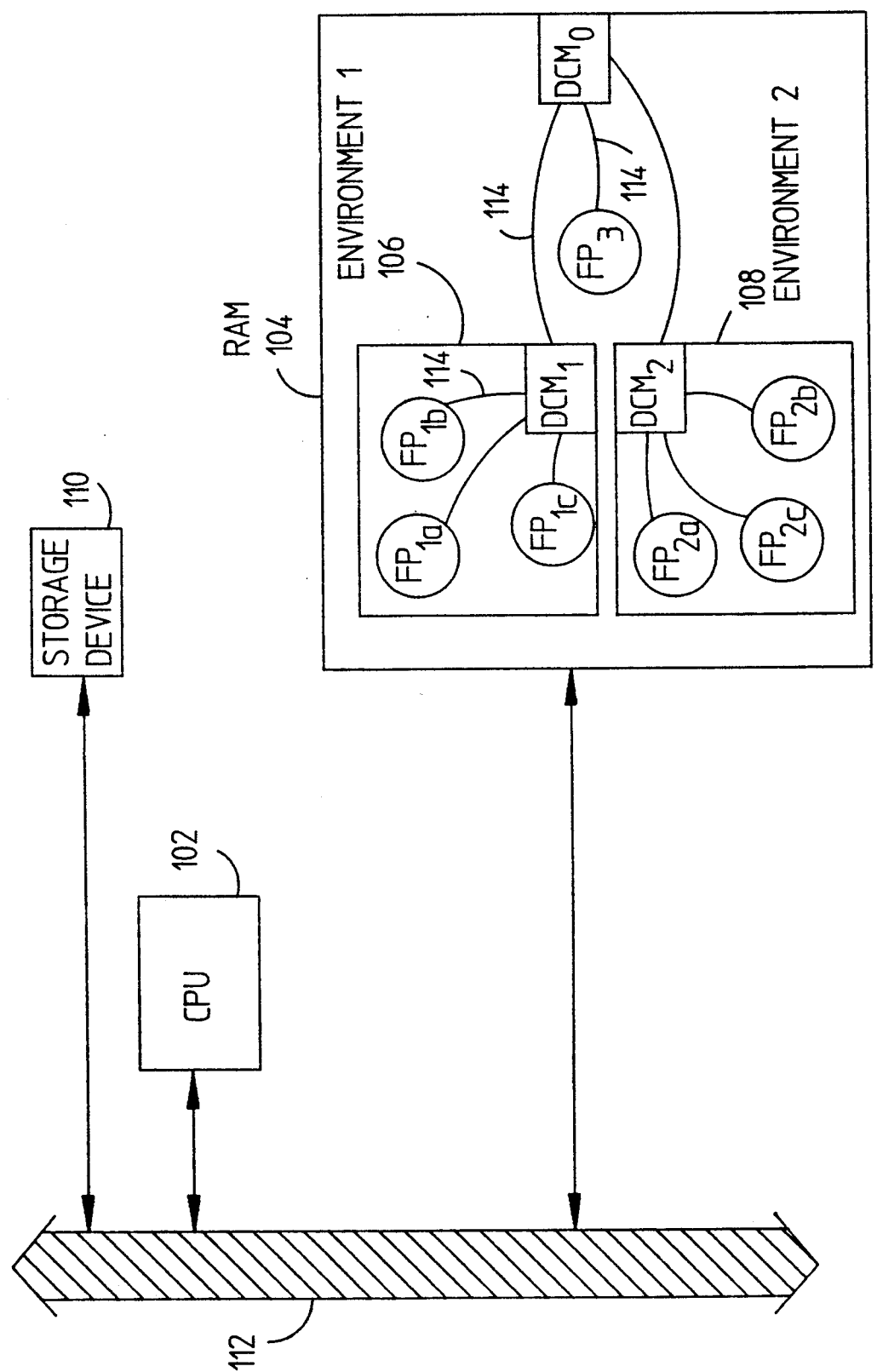
FIG. 1 is a diagram of one computer system environment contemplated for use with embodiments of the present invention.

The present invention is a system and method for selecting running functional processes within an object-oriented environment, based upon specified criteria. More specifically, the present invention relates to a system and method for selecting running functional processes to service an operation request, such that information which relates to the requesting functional process and which is used to make the determination for selecting the running functional process is available from the operation request.

A "functional process" as contemplated by the present invention can be defined as an entity that performs tasks. Examples of a functional process include computer programs such as word processors, spreadsheets, compilers, etc. Embodiments of the present invention contemplate use with multi-user or multi-processing computer systems, and thus the use of multiple instances of functional processes simultaneously running is advantageously utilized.

In general, the present invention allows functional processes to be "bound" together in a single environment, such that the environment can exhibit the functionality of the combination of these functional processes. As discussed in the Background Of The Invention section above, the advantage of combining separate functional processes into a single environment is to combine the functionality of the constituent functional processes into a single entity. This single entity would then have the combined capabilities of the constituent functional processes, and could "export" those capabilities to other outside entities.

The present invention also allows environments and functional processes to communicate with one another without being concerned about which type of entity (environment or functional process) is being communicated with. In this way, the communicating entities are not required to use different protocols depending upon the entity they are communicating with. Further, a functional process can be utilized by the present invention with only a minimal amount of modification. This means that "commercial" programs would require only minor modifications in order to take advantage of the features of the present invention.

To better understand the various embodiments of the present invention, it should be thought of as comprising two aspects. The first aspect concerns the construction of the environments. Embodiments of the present invention contemplate the use of object-oriented techniques in constructing the individual environments. Since many of today's computer programs are written using object-oriented languages, the fact that these environments are created using object-oriented techniques gives the present invention an advantage, as indicated in the Background Of The Invention section above. Details concerning the construction of environments will be discussed further below.

The second aspect of the present invention concerns the mechanism which allows functional processes and environments to interact with each other, once constructed. An overview of this mechanism and embodiments of the surrounding setting of the mechanism is shown by FIG. 1.

Referring to FIG. 1, a storage device 110, Central Processing Unit (CPU) 102 and a Random Access Memory (RAM) 104 are shown. Also shown is a bus 112 which interconnects the above-noted items.

Of particular relevance to the present invention is the RAM 104. Referring to RAM 104, an example of environments which have been constructed by the present invention is shown. In this example, Environment 1 and Environment 2 have been created to each contain 3 constituent functional processes (FP). Also shown is a functional process labelled FP3 which is not part of either of these environments.

Embodiments contemplated for use with the present invention contemplate that each environment contains its own Distributed Communications Manager (DCM). It is these DCMs which control the communication between functional processes within and between environments. The DCMs which control communication within environments in this example are DCM1 and DCM2. DCM0 controls the overall communication between environments, and controls communication with FP3.

Each environment, functional process and DCM communicates via a "socket." Examples of sockets are indicated by Reference 114. In embodiments of the present invention, one end of a socket will always be attached to a DCM.

It is via these sockets that functional processes can provide and request services to one another within an environment. In addition, for environments and functional processes not within an environment, the sockets can provide the "overall" computer environment system (hereafter referred to as "environment system") access to the services provided by the environment as well as allow the environment to request services from the environment system. In this example, the environment system comprises the entities within RAM 104.

Embodiments of the present invention contemplate that UNIX "socket" techniques are used. In these embodiments a socket appears to the DCM and to each functional process as a file to or from which a stream of bytes may be written or read across a distributed system. More information regarding this concept can be obtained from "Introducing the UNIX system V" by Rachel Morgan, which is incorporated by reference herein. It should be understood, however, that the present invention contemplates communication mechanisms other than sockets as well.

In operation (as contemplated by embodiments of the present invention), a functional process makes a request for a service. For example, the functional process may be a text editor used to write computer source code, and the requested service may be to "compile." If there is another functional process within the environment system which can perform the requested operation, the operation will be performed, and the result sent to the requesting functional process. The precise functional process (and corresponding environment) which performs the requested operation is envisioned to be set up by the user(s) during construction of the environment(s). However, the present invention also contemplates situations where this decision is automated as well.

For the purposes of this example, assume that functional process FP2a in Environment 2 (108) is a text editor, and that a user has written a computer program using that editor. Further assume that the user wants to compile the computer program. If such facilities do not exist in Environment 2 (108), then DCM2 can send a request (and relevant parameters) to DCM0, which represents the environment system. DCM0 then determines whether there are any entities which can perform the requested operation. If FP1a in Environment 1 (106) is a compiler which can perform the operation, then Environment 1 (106) can respond to Environment 2 by having FP1a perform the requested operation and send the results back to PF2a in Environment 2 (108) via DCM0. Such a transaction would involve all 3 of the DCMs shown.

As indicated above, the requesting functional process is not concerned with who performs the requested operation. Thus, the requested operation could just as well have been performed by FP3, and FP2a would be none-the-wiser.

Embodiments of the present invention also allow for a functional process to be accessed only by other functional processes within its own environment. This, for example, allows for a greater degree of security where a user does not wish all users on the environment system to access certain functional processes.

Another aspect of the present invention is that it allows functional processes to interactively communicate with one another while they are actually executing. For example, if a spreadsheet program is executing, a second functional process can be calculating data for the spreadsheet. When the second functional process has completed its calculation, it can then send the data to the spreadsheet, which can then automatically incorporate the data into the appropriate cell(s).

The type of interaction discussed above allows for greater flexibility in creating interactive systems. In addition, this feature also allows for functional processes to remain in RAM 104 in a kind of "background mode" even when not currently used. In fact, the example in FIG. 1 assumes that the functional processes shown are either in actual use or else in this background mode. If this were not the case, they would be stored on the storage device 110 and would have to be read from the storage device 110 and transferred to the RAM 104 each time they were used.

Keeping the functional processes in RAM 104 allows for quicker execution of the functional processes when they are needed. Since this takes up valuable memory, however, some embodiments of the present invention contemplate the ability to keep functional processes in RAM 104, as well as starting up functional processes as needed. While RAM 104 shows several interconnected entities, it should be understood that embodiments of the present invention also contemplate the construction of multiple environments and/or separate functional processes which are not all interconnected. The present invention also contemplates multiple levels of environments, where the constituents of environments are themselves environments.

Embodiments of the present invention contemplate that the CPU 102 used with the present invention is an Intel 80386 manufactured by the Intel Corporation of Cupertino, Calif. Of course, the present invention also contemplates that other types of CPU 102 be used as well.

Figure 2:
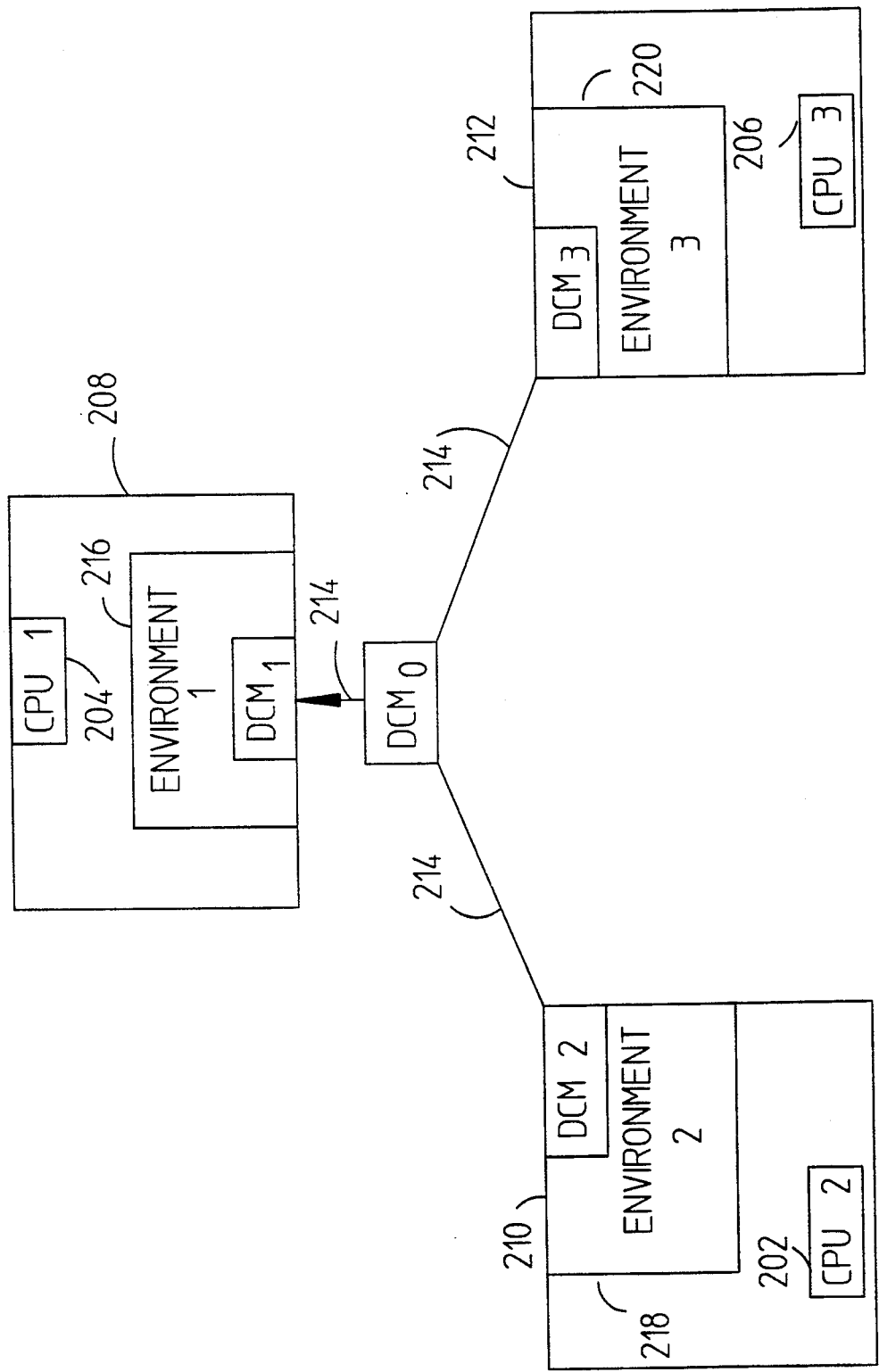
FIG. 2 is a diagram of another computer system environment contemplated for use with embodiments of the present invention.

Another example embodiment of the present invention is shown by FIG. 2. In this embodiment, the environment system is contemplated to be a network, having three nodes. In FIG. 2, these three nodes are shown at Reference Numbers 208, 210 and 212. Each of these nodes has its own environment (216, 218 and 220) and CPU (202, 204 and 206). The nodes communicate via sockets, which are shown by Reference Number 214. In effect, each of the environments can communicate with one another as though they were located on the same computer or RAM 104 as was shown in FIG. 1. Thus, the actual location of the individual environment (or functional process) is of no concern to the other environments or functional processes.

While FIG. 2 shows each node as having only a single environment, it should be understood that the present invention contemplates that each node could contain multiple environments and multiple single functional processes as well.

Detailed embodiments concerning the construction and operational mechanisms for the present invention are now discussed below.

II. Construction of Environments and Environment System

Figure 3:
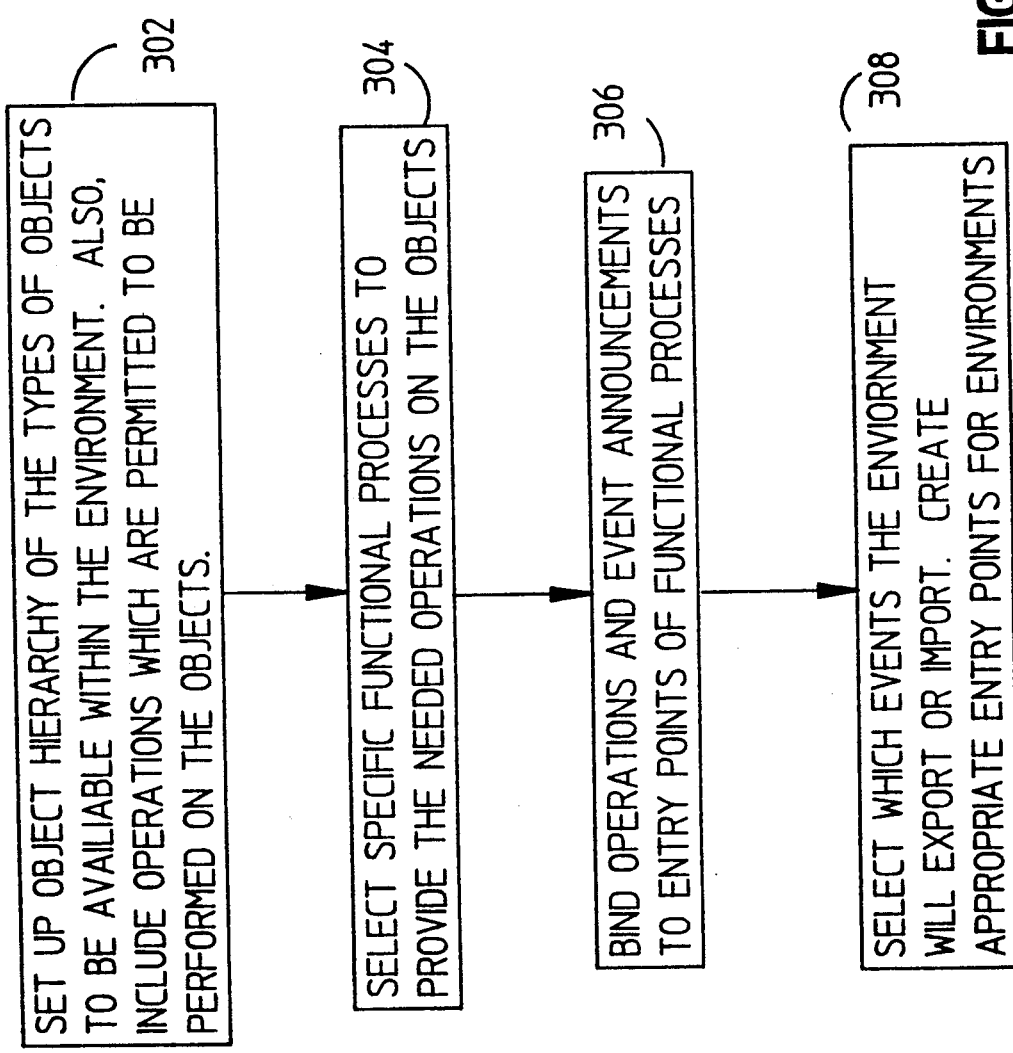
FIG. 3 is a high-level flow diagram of the construction of an environment contemplated by embodiments of the present invention.

The way in which environments are constructed in the present invention can best be explained in conjunction with the flowchart shown in FIG. 3. This flowchart describes the construction of environments using an environment constructor as contemplated by embodiments of the present invention. Subsequent Figures are then used to help illustrate these steps and the concepts which they embrace.

Referring now to FIG. 3, the first step in constructing an environment is to set up an object hierarchy of the types of objects to be available within the environment, as indicated by a block 302. These "objects" represent items which allow themselves to be manipulated due to operation requests from the various functional processes. In addition to "listing" the objects in the hierarchy, operations which are permitted to be performed on the objects (as well as attributes of the objects) should also be included in this hierarchy, as further shown by block 302.

Figure 4:
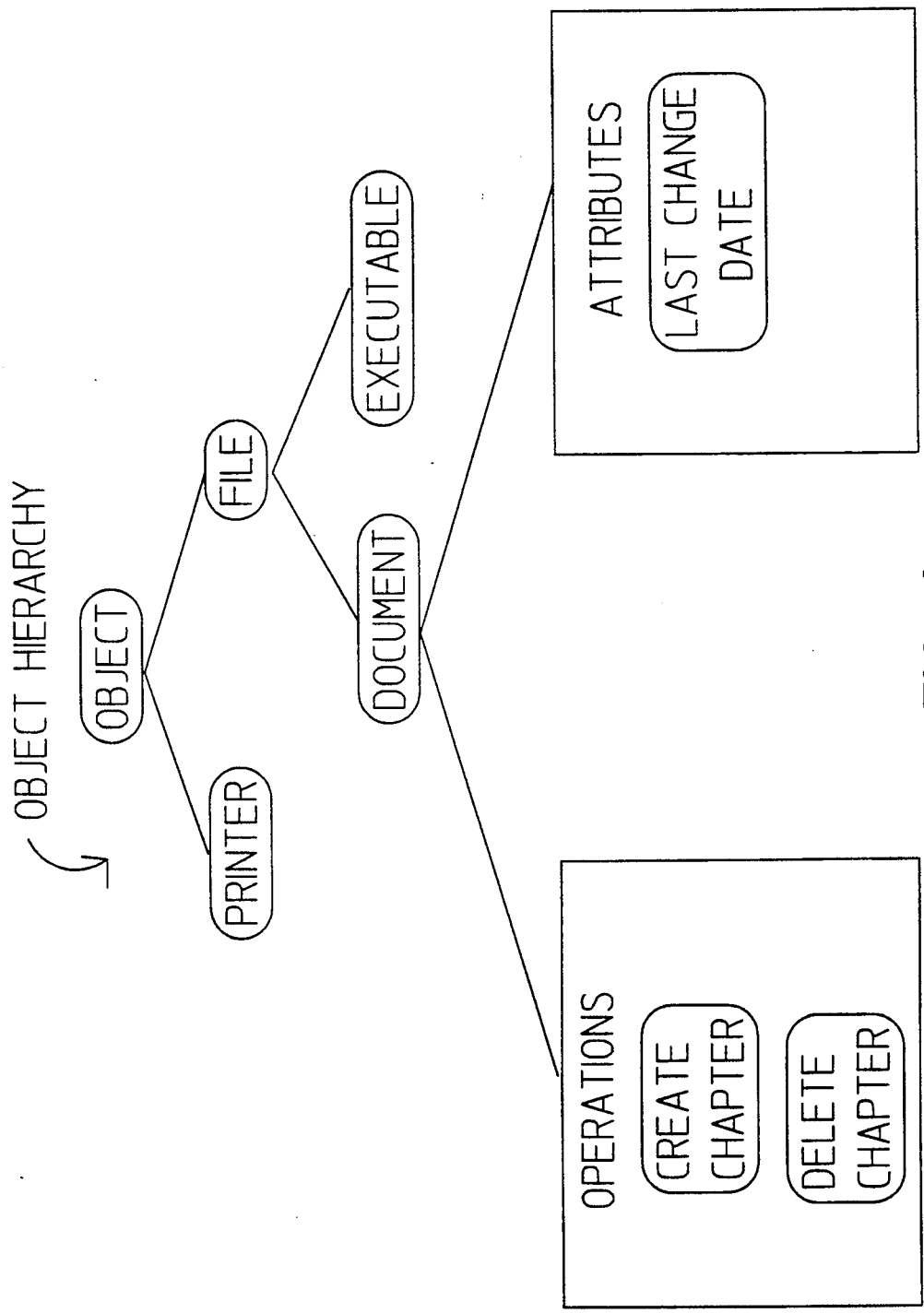
FIG. 4 is an example of an object hierarchy for use with embodiments of the present invention.

A specific example of an object hierarchy contemplated by embodiments of the present invention is shown in FIG. 4. Referring now to FIG. 4, the most general of these objects is simply referred to as "object," beneath which are two other objects, "printer" and "file." In this example, the object "file" contains the objects "document" and "executable." The "document" object refers to those objects which can be manipulated by, for example, a word processor.

The "document" object in FIG. 4 is shown to have certain operations and attributes associated with it. As indicated above, the operations are allowable acts which can affect the object. This means that all entities which are instances of a "document" will inherit the properties of the document object. In this example, the operations which are permitted to be performed on documents are "create chapter" and "delete chapter." In addition, the document object is shown to have certain attributes. In embodiments of the present invention, these attributes contain only a single value. In this particular example, the attribute shown is "last change date."

It should be understood that the example of an object hierarchy shown in FIG. 4 is only an example, and that any number of different object hierarchies can be constructed. It should also be noted that the general principles behind the object hierarchy used by the present invention are consistent with the object hierarchy model of PCTE (see Background Of The Invention section), which is incorporated by reference herein. However, the present invention enhances the model discussed in PCTE by adding operations to the hierarchy.

A more in-depth discussion on the use of the PCTE model as contemplated by certain embodiments of the present invention can be found in co-pending patent application Ser. No. 071/692,092, which is incorporated by reference herein.

Referring back to FIG. 3, the next step in constructing an environment is to select specific functional processes to provide the needed operations on the objects, as indicated by a block 304. Since the present invention contemplates that functional processes can service needed operations as well as request that they be performed, there needs to be some mechanism to communicate this information. This mechanism is discussed below.

In embodiments of the present invention, communication between functional processes is facilitated by what are called "event messages." An event message is typically either an operation request or an event announcement. An operation request is a request from a functional process for some other functional process to perform a specified function. An event announcement is merely a message that a specific action has occurred (for example, that a specific compiler was invoked).

Figure 5:
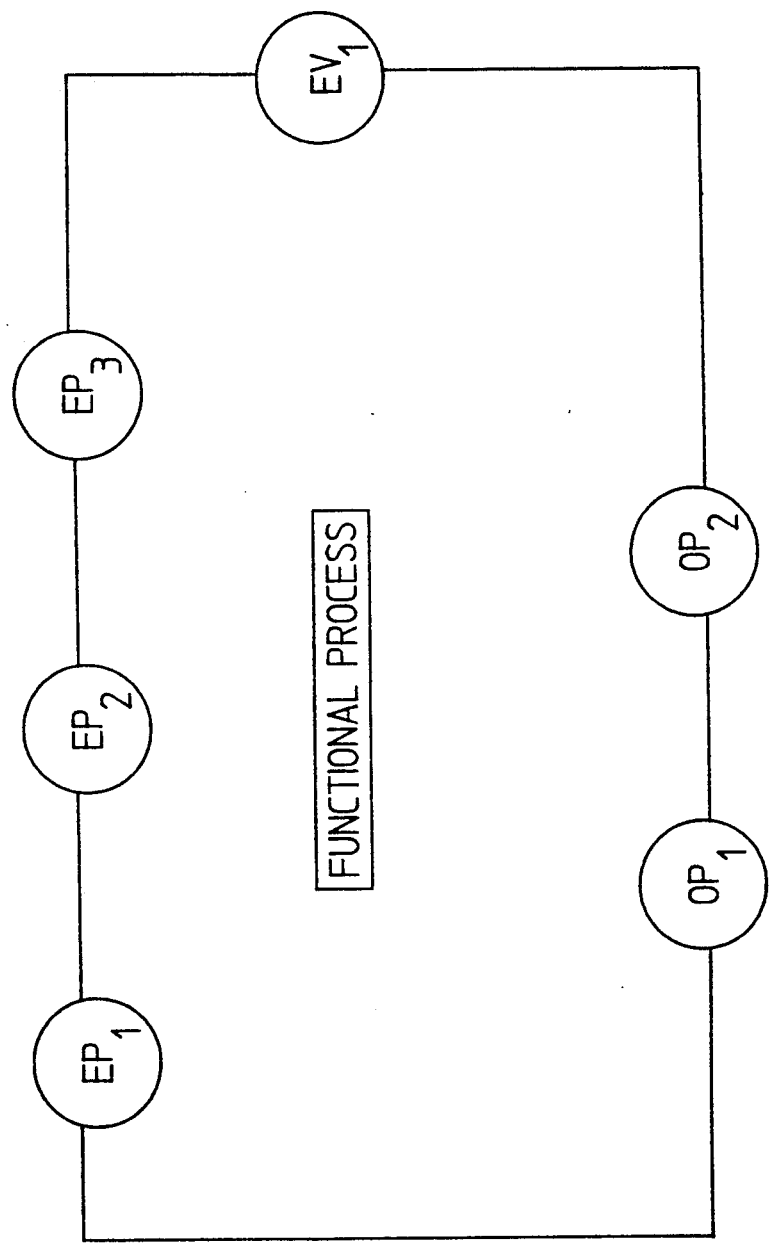
FIG. 5 is an example of a functional process and its associated entry points, event announcements and operation requests.

An example of the way in which a functional process communicates is shown in FIG. 5. Referring now to FIG. 5, the functional process is shown to have associated with it 3 entry points (EP1, EP2 and EP3) two operations (indicated by OP1 and OP2) and one event announcement (indicated by EV1). The entry points represent functions that the functional process is capable of making available to the environment. More specifically, they describe operations the functional process provides or the event announcements it listens for.

It should be emphasized that Embodiments of the present invention contemplate that an entry point is not the physical means by which a functional process receives information. Instead, it only represents some functionality of the functional process. Actual communication is performed using a socket, which passes information identifying the specific function requested (i.e. identifying the entry point) and all parameters needed by the entry point.

The operations listed represent operations that the functional process may want accomplished. In essence, it is the converse of the entry points. Thus, if the functional process requires some service performed, it sends an operation request out through its socket.

The event announcement listed represent specific announcements to inform some other functional process that the functional process just performed a task. For example, if the functional process shown in FIG. 5 was a compiler, there ma be a second functional process in the environment that would like to be informed every time the compiler is executed. Thus, EV1 represents an event announcement which would physically be sent through the socket of the functional process to a DCM and received via the socket of the second functional process every time the present functional process is executed. In addition, embodiments of the present invention contemplate that an event announcement sent to a DCM may be forwarded to any number of other functional processes.

After deciding on which functional processes to use to manipulate the selected objects, the functional processes need to be connected together so that they communicate in a desired manner. More specifically, the next step is to bind the operations and event announcements listed by the functional process to entry points of the functional processes, as indicated by a block 306 in FIG. 3. This binding can be thought of as creating maps which specify specific data paths between functional processes within an environment. An example demonstrating the binding of functional processes is shown in FIG. 6.

Figure 6:
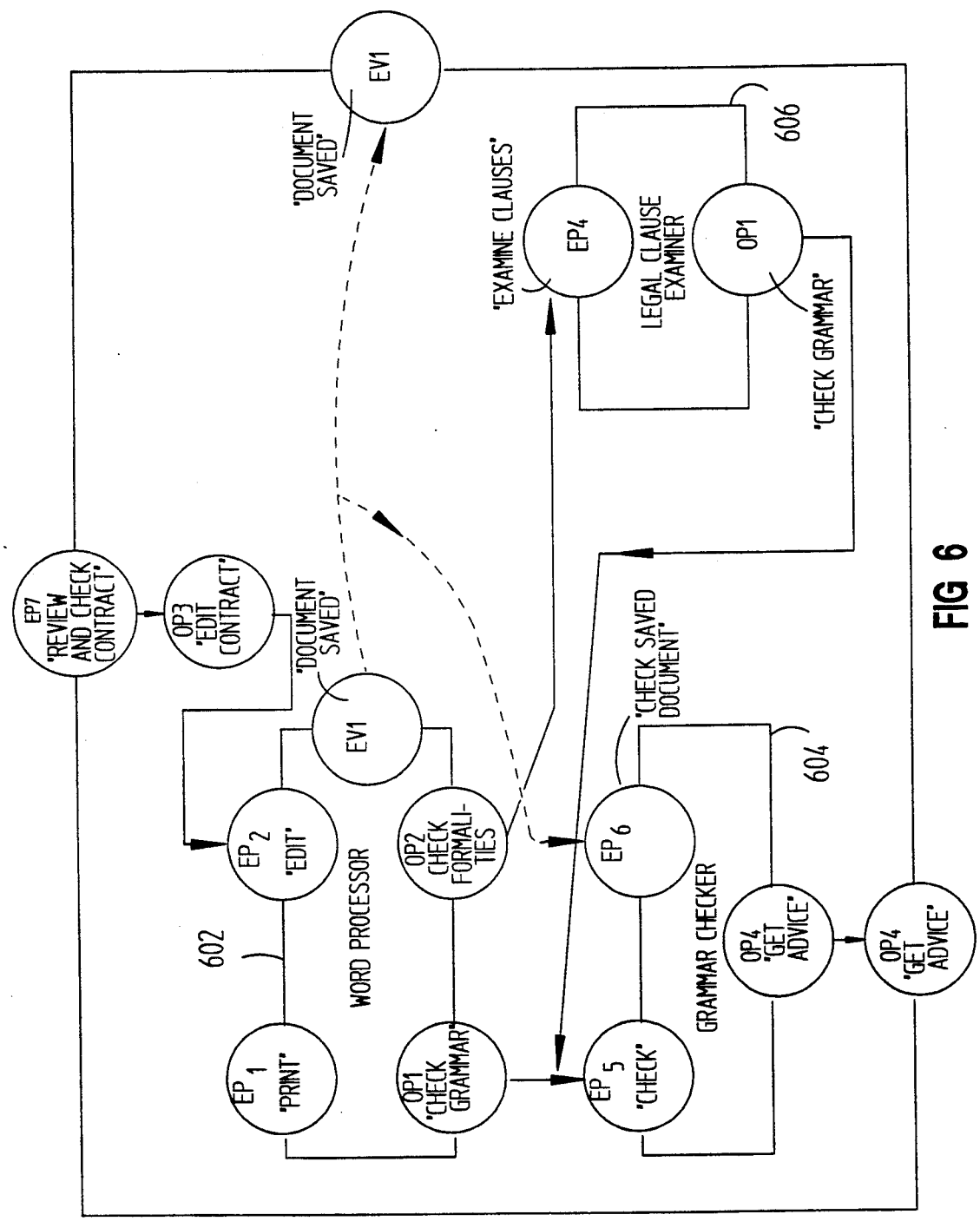
FIG. 6 is an example of several functional processes bound together to form an environment.

Referring now to FIG. 6, an example of three functional processes bound together is shown. The solid lines which are drawn from operation points to entry points represent operation requests, while dotted lines from event points to entry points represent event announcements. In this example, a desired function of this environment is for it to assist in the drafting of a legal document such as a contract. Three functional processes that have been chosen to facilitate this function are a word processing program 602, a grammar checker 604 and a legal clause examination program 606 that ensures that appropriate clauses have been put into a document.

In this example it is assumed that some outside entity wants to review and check a contract for grammar and proper legal clauses. EP7 indicates to the environment system outside this environment that it is capable of performing this operation. When the DCM that is attached to this environment via a socket receives a request to review and check a contract, this DCM sends the present environment information over that socket that EP7 is to be used.

It should be noted that this figure relates to high-level "conceptual" communication between functional processes, and thus the concepts of sockets and DCMs are not discussed. It should be kept in mind, however, that all actual communication does involve those items.

When an operation request for EP7 ("review and check contract") is received, the first action that the environment is to take is for the word processor 602 to execute, and for the contract to be read into it. However, the operation request only has information for finding EP7, and does not have information for how the functional processes within the environment are to be used.

Within this environment, the first action to be taken to implement the "review and check contract" entry point is to edit the contract. To accomplish this, the entry point request is converted to an operation request for "edit contract," OP3.

The use of OP3 as discussed above also allows for the possibility of adding an event announcement so that an event announcement could be sent to any functional process who wanted to "listen" as soon as an operation request was received into the environment. Otherwise, for example, if EP7 was attached directly to EP2, then the word processor 602 would have to be specially written to provide for this (i.e. it would be more difficult to implement).

Once the legal document has been reviewed and/or revised on the word processor 602, the user may then want to run the document through the grammar checker 604. Consequently, the word processor 02 would want to send an operation request to the grammar checker 604, and receive the result of the performed operation. This operation request is represented by OP1 of the word processor 602, which is shown to be "bound" to the grammar checker 604 via EP5. Thus, EP5 represents the grammar checker's ability to perform the operation of checking the contract for proper grammar.

In addition to checking for grammar, assume the user of the word processor 602 also wants to ensure that all the proper legal clauses exist in the legal document. Consequently, the user would want to utilize the services of the legal clause examiner 606. This is represented by "binding" OP2 of the word processor 602 with EP4 of the legal clause examiner 606. As indicated, OP2 represents the requested operation ("check formalities") while EP4 represents the service provided ("examine clauses").

As indicated above, the operations listed on a functional process are indicative of particular operations requested, and are not unique to any particular functional process. This is shown by the fact that in this example, the legal clause examiner can also directly request a grammar check of a document that it is working on. More specifically, the legal clause examiner 606 is bound to EP5 of the grammar checker by OP1. Thus, the same "operation point" is used to bind the word processor 602 and the legal clause examiner 606 to the grammar checker 604.

Let us assume that in addition to a user periodically manually requesting that the grammar checker 604 be activated that it is also desirable to have the grammar checker automatically execute when the legal document is saved to a file. This can be accomplished using an event announcement. The connection of EV1 to EP6 shows this binding. Once bound, every time the word processor 602 saves the legal document, the grammar program will check the saved document.

So far, only communication between functional processes within the same environment have been discussed. However, a key aspect of the present invention is that it allows environments to communicate with one another, and in the same way that functional processes communicate amongst themselves. To explain how embodiments of the present invention accomplish this, it is useful to continue to refer to FIG. 6.

Still regarding FIG. 6, let us now assume that entities outside of this environment may want to be notified that the word processor has saved a document. The environment can extend access to this information by providing an event announcement point EV1. Here, the environment's EV1 is shown bound to the EV1 of the word processor 602.

In addition to providing services outside the environment, the functional processes within the environment may themselves require services that are not available within their environment For example, if the grammar checker required some service not available within the environment, it can be obtained elsewhere via OP4, as shown in FIG. 6.

As indicated above, FIG. 6 is only an example. Any number of different configurations using any number of functional processes are also contemplated.

The above-noted notion of selecting which events (that is, operations and event announcements) the environment will export and import and creating entry points for the environment is indicated by a block 308 in FIG. 3. This is the last step in the environment construction process. Another perspective concerning the construction of an environment, however, is described regarding the data flow diagram of FIG. 7.

Figure 7:
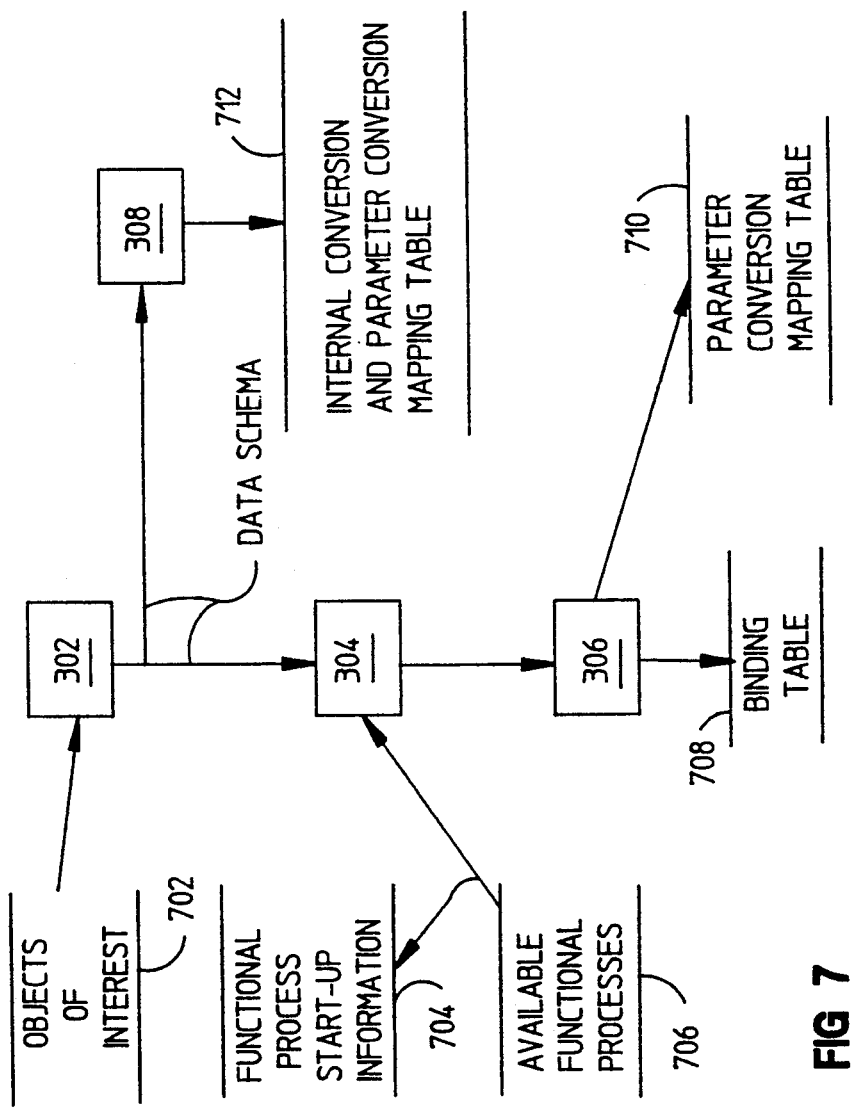
FIG. 7 is a data flow diagram for the construction of environments as contemplated by embodiments of the present invention.

Referring now to FIG. 7, the rectangular blocks represent the individual steps discussed above from FIG. 3. The text having only a line above and below it represents data stores. Data store 702 labeled "object of interest" represents those objects that a user has decided to make available within the environment. These are the objects that are used to create the object hierarchy indicated by block 302 (as first discussed regarding FIG. 3 above). A data schema is formed from this hierarchy and is used by blocks 304 and 308.

The data flow going into block 304 is used to set up intra-environment communication while the data flow going to block 308 is used to set up inter-environment communication. Referring first to the data flow going into block 304, the user first selects the functional processes from the "available functional processes" data store 706 and also obtains any functional process start-up information needed from data store 704. Once specific functional processes have been selected, operations and event announcements are bound to their selected entry points as discussed by block 306 of FIG. 3. This binding process creates two tables. The first table is called a "binding table" 708. The binding table 708 contains information concerning which entry point(s) and which functional process(es) are to receive an operation or event announcement when another functional process makes an operation request or event announcement. Thus, it serves as the "map" by which functional processes communicate with each other.

In embodiments contemplated by the present invention when an entry point is bound to an operation on an object type, (e.g., when an entry point on a functional process which can "delete a chapter" has been chosen by a user to be used by another functional process to perform the operation of deleting a chapter in a "document") the same entry point will be used on all sub-types of that object type (e.g., for "contract" documents), unless a new entry point is specifically bound to the operation on that sub-type. Thus, entry points themselves can be inherited. For example, if we use Word Perfect as the functional process for performing an operation for the "document" type, word perfect will also used for the sub-type as well.

In use with embodiments of the present invention, the binding table expects to receive a functional process ID and an Entry Point ID as input. The functional process ID is a unique identifier that the environment has given to the functional process and the Entry Point ID is an identifier for a specific function that can be executed by the functional process. For example, a functional process ID might be Lotus 123 and an Entry Point ID might represent the function of selecting a cell within a spreadsheet for input. More specifically, the Entry Point ID is associated with a particular entry point (i.e. a particular function) of a functional process.

The second table formed is the Parameter Conversion Mapping Table 710. In operation, this table expects to receive the necessary parameters for performing the requested operation, as well as the functional process ID and an Entry Point ID as input. The purpose of this table, however, is to provide a degree of flexibility to the environment.

For example, a functional process may expect a specific spreadsheet program to service an operation request. It thus sends the appropriate parameters to allow the spreadsheet program to perform the requested operation. However, a user may decide to replace the spreadsheet program with a different one which requires different parameters. Rather than modifying the requesting functional process (of which there may be more than one), the Parameter Conversion Mapping Table 710 allows parameters to be converted to a form which is acceptable by the new functional process. It should be noted, though, that the replacement of a functional process with a different functional process does not always require parameter conversion, and thus the Parameter Conversion Mapping Table 710 is only utilized when needed.

Referring now to block 308 in FIG. 7, as indicated previously concerning FIG. 3, this block indicates that the operations and event announcements that the environment will export and import are selected, and that the appropriate entry points are created. In doing this, embodiments of the present invention contemplate that an Internal Conversion and Parameter Conversion Mapping Table is created.

The Internal Conversion and Parameter Conversion Mapping Table receives an "entry request" as input. An entry request is the same as an event message, except that it also includes the additional element of an Entry Point ID. The significance of this additional element will be discussed further below.

As contemplated by embodiments of the present invention, the Internal Conversion and Parameter Conversion Mapping Table has two primary functions. First, it converts any event announcement or operation request sent from outside the environment to a corresponding event announcement or operation request which appears to the receiving functional process to have originated within the environment. This was discussed above with regard to FIG. 6 and OP3. Second, it converts parameters in the same way as discussed regarding the above-mentioned Parameter Conversion Mapping Table.

Figure 8:
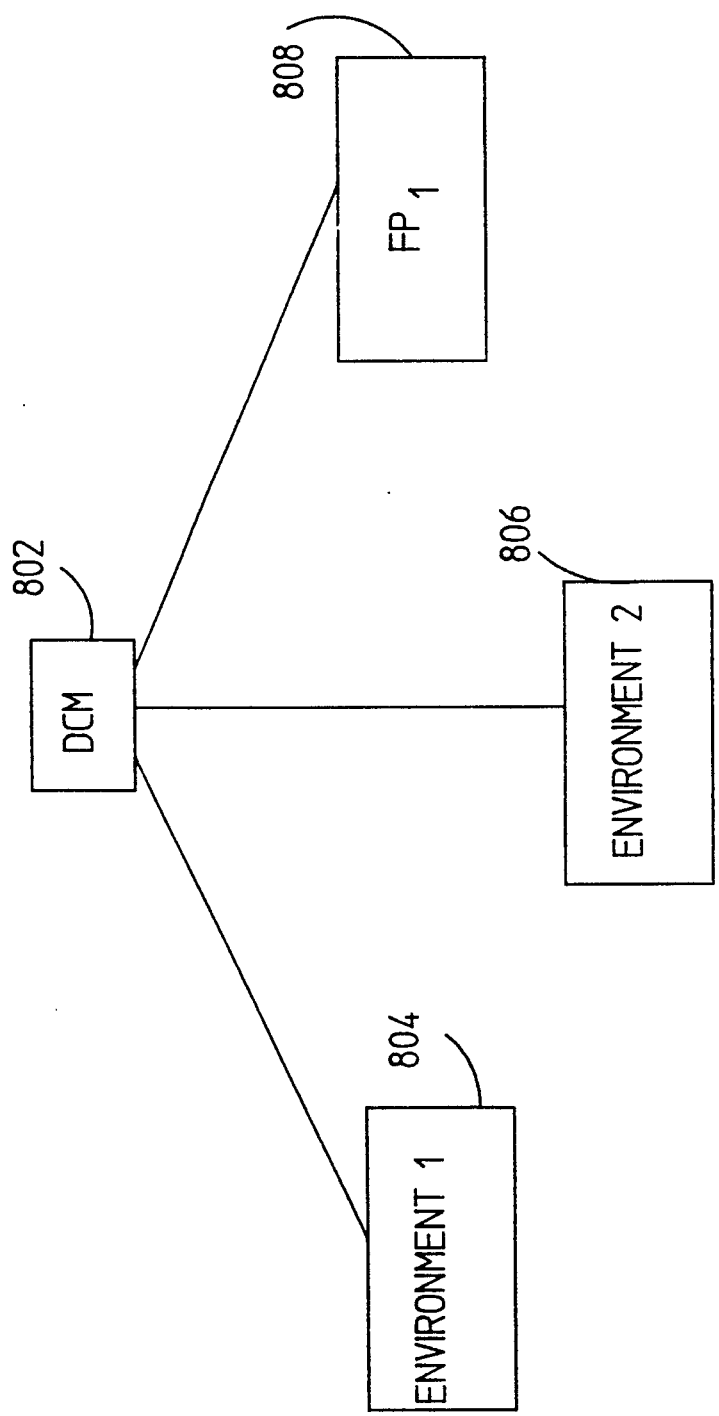
FIG. 8 is a high-level example demonstrating use of environments of the present invention.

A high-level example of the usage of completed environments contemplated by the present invention is shown by FIG. 8. Referring now to FIG. 8, two environments have been created (Environment 1 (804) and Environment 2 (806)) as well as an isolated functional process (FP1 808). These are all interconnected via a DCM 802. Thus, if a functional process within Environment 1 (804) requires the performance of an operation that cannot be done by an intra-environment functional process, it will send an operation request to the DCM 802 asking it if the requested operation can be performed elsewhere. If it is available on either Environment 2 (806) or FP1 808, then one of those entities will perform the needed service.

Figure 9:
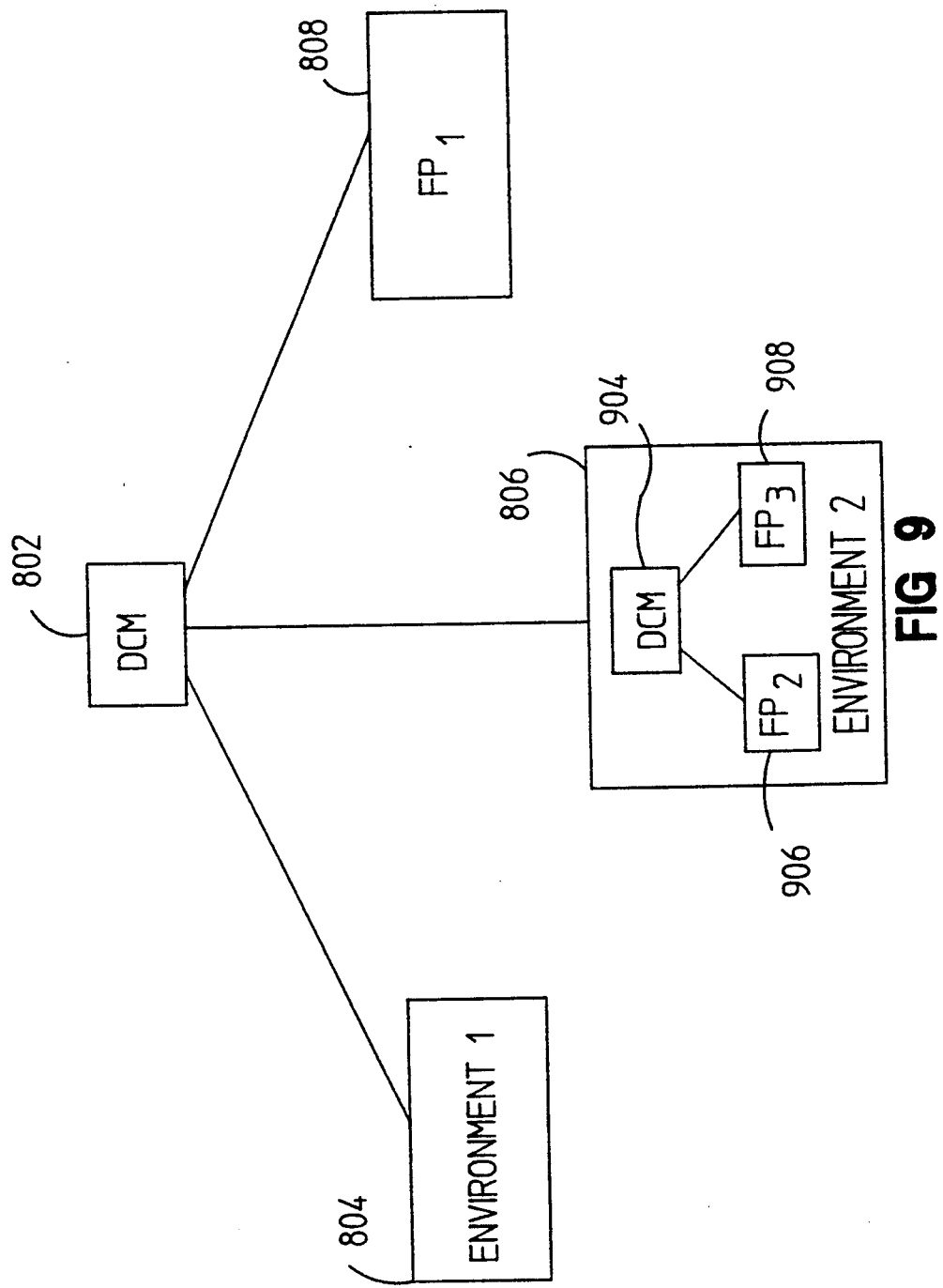
FIG. 9 is a lower level example demonstrating use of environments of the present invention.

FIG. 9 shows that in embodiments of the present invention an environment actually contains its own DCM. Thus, each operation request and event announcement would actually utilizes a DCM when communicating with a functional process within the environment. When communicating with an entity outside of the environment, a "master" or higher level DCM outside the environment (representative of a higher level object oriented environment) would also be communicated with. In FIG. 9, this DCM is shown as DCM 802. The DCM within the environment is referred to as DCM 904.

As an example of the communications possible regarding the environment system shown by FIG. 9, assume that a functional process within Environment 1 requires an operation which is not available within its environment. It would then send an operation request to DCM 802, which would then evaluate whether Environment 2 (806) or FP1 808 could perform the operation. If this particular operation has been bound to an entry point in Environment 2 (806) (in accordance with the binding table 708 contained within DCM 802), then DCM 802 sends the operation request to the appropriate entry point of Environment 2 (806). This will then be converted by DCM 904 (using its Internal Conversion And Parameter Conversion Mapping Table 712) into an operation bound to the appropriate entry point of FP2 906.

It should be noted, however, that regardless of whether the operation request is serviced by Environment 2 (806) or FP1 808, the servicing entity is totally transparent to Environment 1 (804). In effect, Environment 2 (806) is a "composite functional process" as far as DCM 802 is concerned. One result of this is that Environment 2 (806) looks no different than a functional process from the DCM's 802 point of view.

It should be understood that while both FIG. 1 and FIG. 9 show functional processes within environments, embodiments of the present invention also contemplate environments being incorporated within other environments as well. Thus, multiple levels of environments can exist.

III. Operation Of The DOM Mechanism

The proceeding section primarily discussed the construction of environments in accordance with embodiments of the present invention. This section describes the mechanism which allows these environments to communicate in the advantageous manner discussed above.

As previously indicated, the DCM is the mechanism which controls the communication between functional processes and between environments. As indicated by FIG. 9 above, the present invention contemplates multiple levels of DCMs. Each DCM services those functional processes or environments directly attached to it. If a functional process under control of a DCM needs the services of another functional process that is not under the DCM's direct control, it communicates with other DCMs. These other DCMs are then relied upon to communicate with the necessary functional process(es) to service a request.

Figure 10:
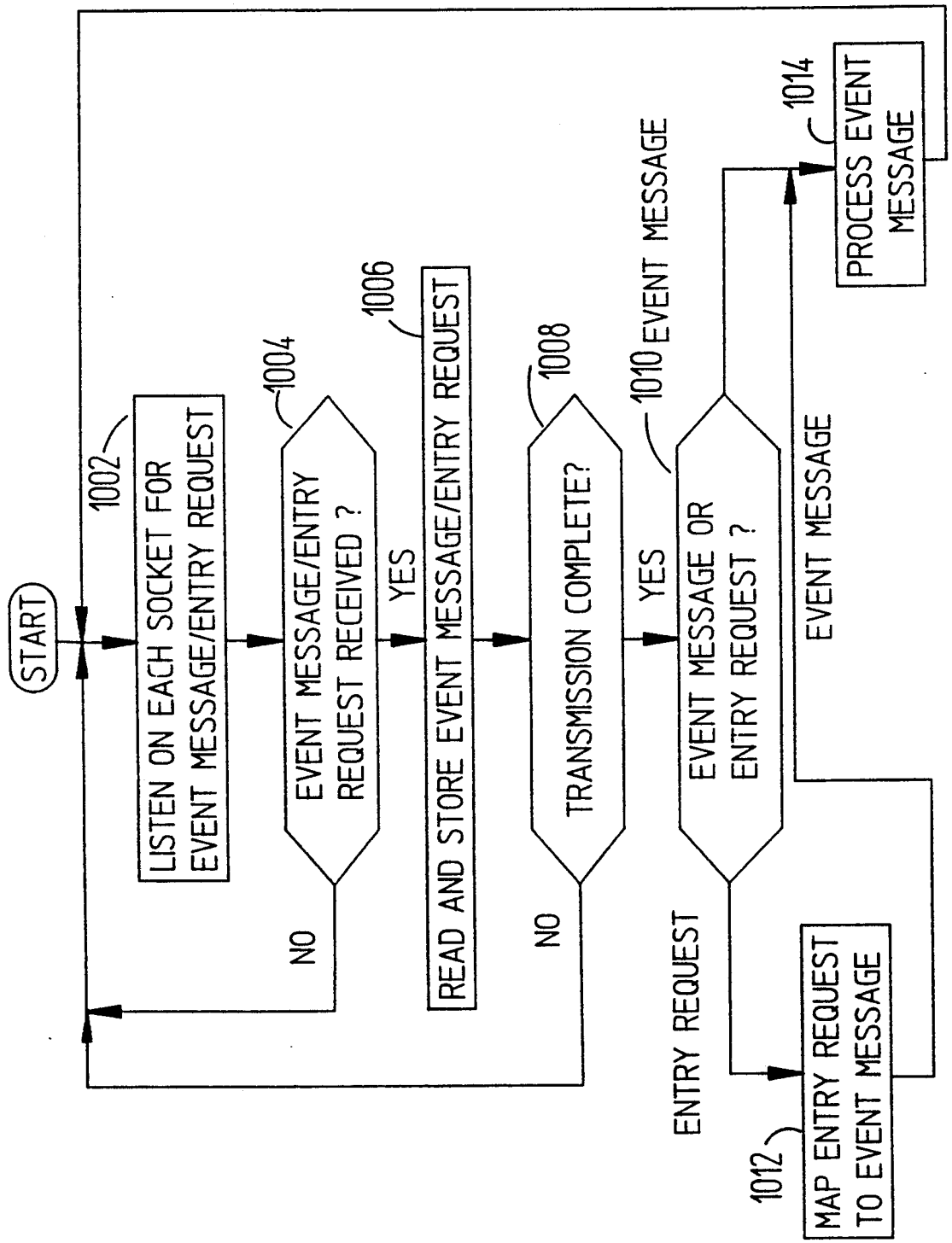
FIG. 10 is a high-level flow diagram of a DCM as contemplated by embodiments of the present invention.

A high-level diagram of embodiments of the DCM mechanism contemplated by the present invention is described below with regard to FIG. 10. Referring now to FIG. 10, a DCM will cycle in a loop as it waits or "listens" on each socket for an event message or entry request, as indicated by a block 1002.

Embodiments of the present invention contemplate that the receipt of an event message would indicate that a functional process has sent an operation request or an event announcement. An event message can be thought of as a message from a functional process to its DCM or from a lower level DCM to a higher level one, requesting that a service be provided (e.g., an operation request) or that one or more functional processes be notified of an event (e.g., an event announcement).

An entry request is essentially just an event message with an accompanying Entry Point ID. In embodiments of the present invention, the "message" that is generated from a DCM is an entry request. It is the same message regardless of whether the DCM is directly communicating with an environment or with a functional process. In fact, the DCM is not even aware of what type of entity is on the receiving end. When the receiver is an environment, though, the "lower level" DCM within the environment will receive the entry request. The lower level DCM can convert it to an event message which is "recognized" by the lower level DCM. This allows the lower level DCM to conceal the details of its operation from the higher level DCM.

Another way to view an Entry Request is that it is the message which is being sent toward some target (i.e. requested or designated) service of a functional process. For this reason, it includes the Entry Point ID.

Referring again to FIG. 10, if no event message or entry request is received on any socket, the DCM will continue to listen on each socket as indicated by a decision block 1004. If, however, some information is received on a socket, then the present invention will read and store the information until the entire transmission is complete. This is indicated by a block 1006 and a decision block 1008.

The next step is to determine whether an event message or an entry request was received. This is indicated by a decision block 1010. If an entry request was received, this means that the DCM which received the information from the socket is incorporated within an environment (and that a higher level DCM sent the message). An example of such a situation is shown in FIG. 9, where the DCM 802 (which represents the incorporating environment) may send an entry request to DCM 904 in Environment 2 (806) so that FP2 906 can perform a requested operation.

With regard to FIG. 6 above, when an operation request is received from outside an environment, it is converted from an entry request into an event message (by the DCM within the environment) to be processed as though it emanated from within the environment. In the example of FIG. 6, EP7 was the external entry point. When an entry request which contains EP7 is processed, it will be converted into an event message containing a request for OP3. The way in which this is done is to map (that is, to convert) the entry request to an event message which can be interpreted by the constituents of the environment, as indicated by a block 1012. This is explained in greater detail with regard to FIG. 11.

Figure 11:
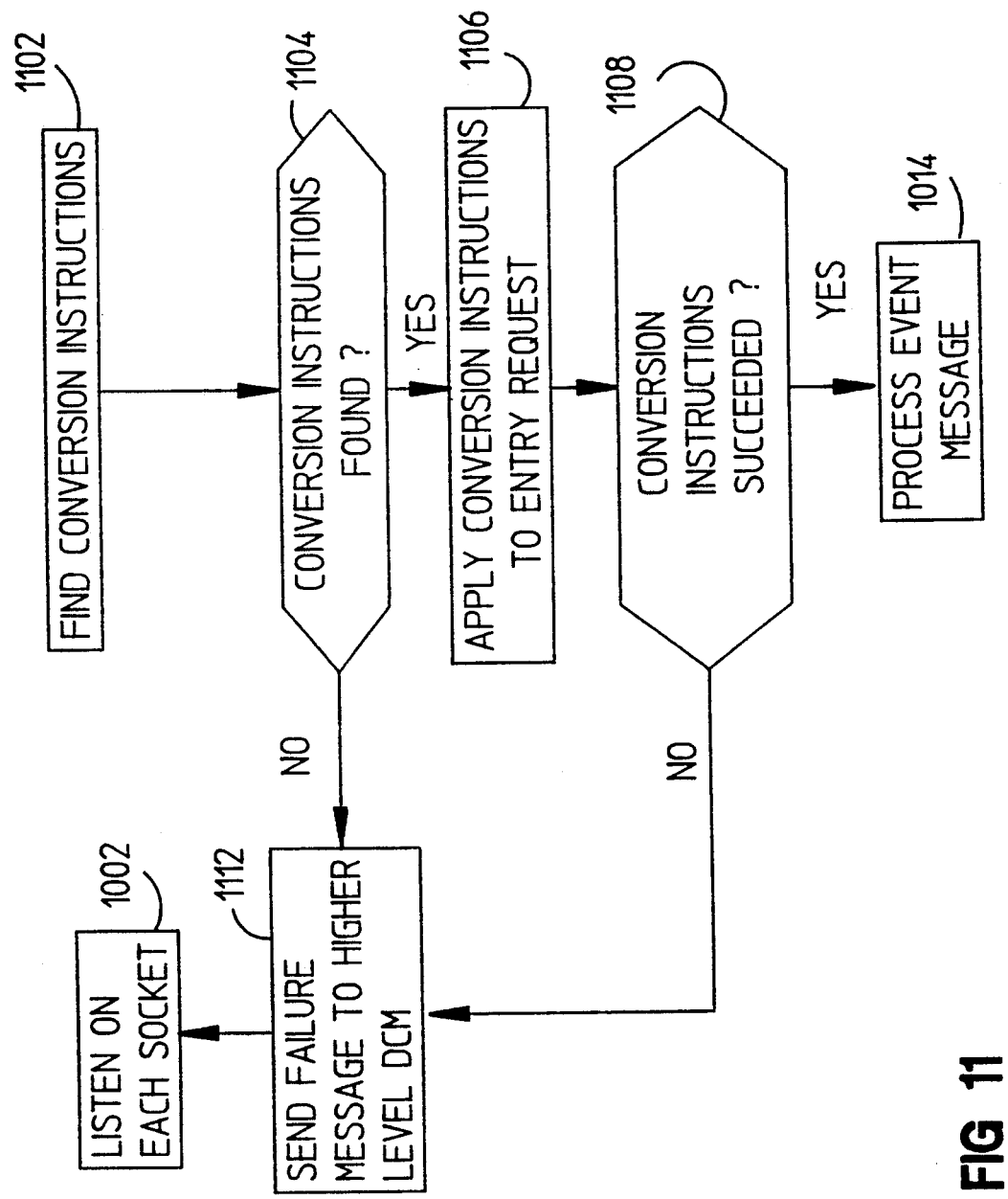
FIG. 11 is a flow diagram for converting the parameters of an event message as contemplated by embodiments of the present invention.

Referring now to FIG. 11, this figure shows the steps taken by a DCM upon receipt of an entry request from a higher level DCM (i.e. one outside the environment of the other DCM). The first step in the process is to use the Entry Point ID found in the entry request as an index into the Internal Conversion and Parameter Conversion Mapping Table 712. (This table was discussed above regarding FIG. 7.) This is done to find conversion instructions, as indicated by a block 1102.

If the conversion instructions are not found, then a failure message will be sent to the higher level DCM as indicated by a decision block 1104 and a block 1112. The present DCM (i.e. the one that received the entry request) would again continue to listen on each socket, as indicated by block 1002.

If the conversion instructions are found, then they would be applied to the entry request, as indicated by a block 1106. If the entry request is malformed in some way, then the conversion instructions are said not to have succeeded, and an error message will result as indicated by a decision block 1108 and a block 1112. If the entry request is normal, then when these instructions are applied to the entry request, an event message is created. Then, the event message is processed, as indicated by a block 1014.

Figure 12:
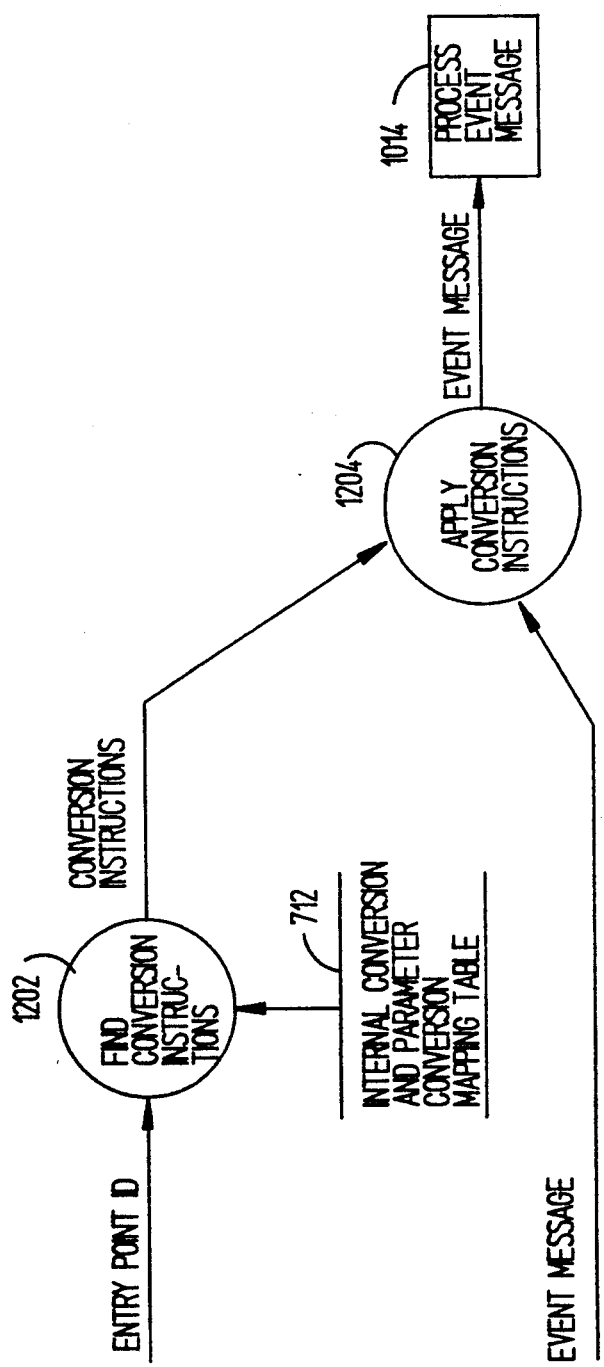
FIG. 12 is a data flow diagram for converting the parameters of an event message as contemplated by embodiments of the present invention.

A data flow diagram corresponding to FIG. 11 is shown in FIG. 12. Referring now to FIG. 12, an event message and an Entry Point ID are shown, which together comprise the entry request sent to the DCM. They are shown as two separate messages in FIG. 12 for the purposes of discussion.

In embodiments of the present invention, the Entry Point ID is used as an index to determine the proper Conversion Instructions (if found) using the Internal Conversion and Parameter Conversion Mapping Table 712. The determination of the proper Conversion Instructions is indicated by process 1202. In this particular case, the Conversion Instructions are essentially a function which, when applied to the event message, is converted to a "mapped" event message appropriate to the present environment. In addition, any parameters which need to be changed to support this mapped event message could be effected here. The application of the Conversion Instructions is shown by process 1204.

Once the Conversion Instructions have been applied (and assuming that they were applied successfully) the event message is processed, as indicated by block 1014. This corresponds to the block of the same name shown in FIG. 10. Upon being received by the appropriate entity within the current environment, it will be treated as though it had been originally sent by an entity within the current environment, as discussed regarding FIG. 6 above.

Note that in FIG. 12 the Entry Point ID has been stripped off. This is because that entry point ID was the ID for the environment, and is no longer of use once the environment has been accessed. However, a new Entry Point ID will be added to the event message before it is actually sent to the target functional process, and thus an entry request will be re-formed. This is discussed further below.

Referring back to FIG. 10, when the transmission from the socket is an event message rather than an entry request, the present invention proceeds to immediately process the event message as shown. No other changes are necessary, since this would mean that the transmission did not come from a higher level DCM (i.e. it came from a lower level DCM or directly from a functional process). The steps contemplated by the present invention for processing an event message are shown in FIG. 13.

Figure 13:
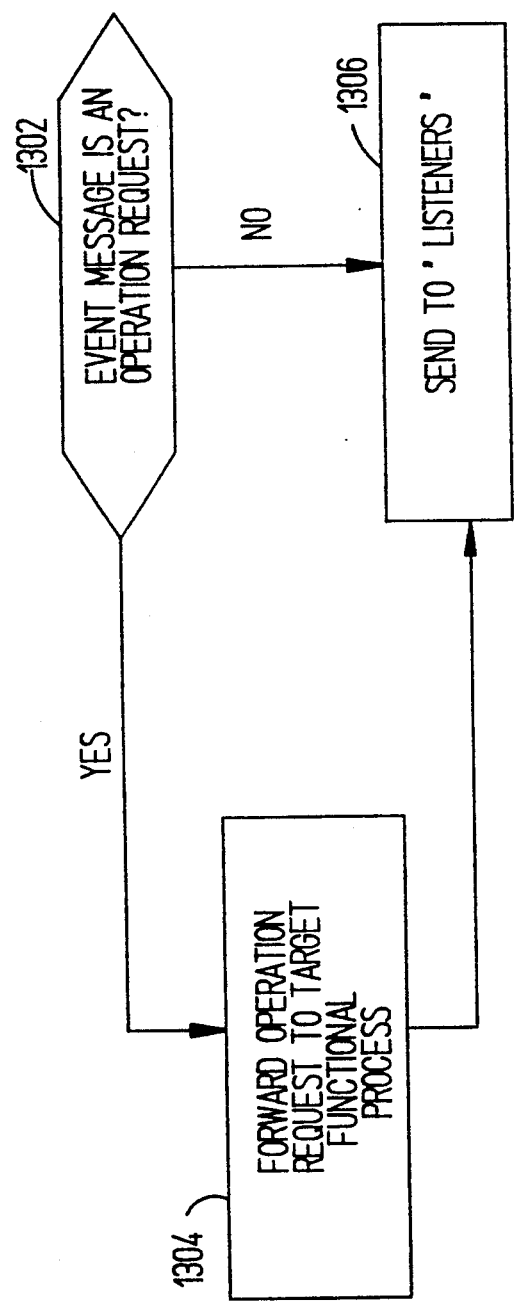
FIG. 13 is a flow diagram showing the processing of an event message.

Referring now to FIG. 13, a determination is made regarding whether the event message falls into one of two categories. The first category is where the event message is an operation request. This possibility is checked for, as indicated by a decision block 1302. If it is an operation request, then it is forwarded to the target functional process, as indicated by a block 1304.

If the event message is not an operation request, it falls into the second category of event messages, which are immediately sent to other functional processes who wish to monitor or "listen" to them. This is indicated by a block 1306. These "other" event messages that can be listened to include "operation complete" messages and error messages, which are all events. These types of event messages are handled separately from operation requests since only one functional process handles an operation request (and thus there is only one entry point at issue), whereas multiple functional processes may be able to "listen" to events that occur. However, as indicated by the connection between blocks 1304 and 1306, operation requests can be "listened to" as well. Further, it should be noted that in embodiments of the present invention, a full fledged "operation" is considered to comprise both an operation request and an operation complete event.

Figure 14:
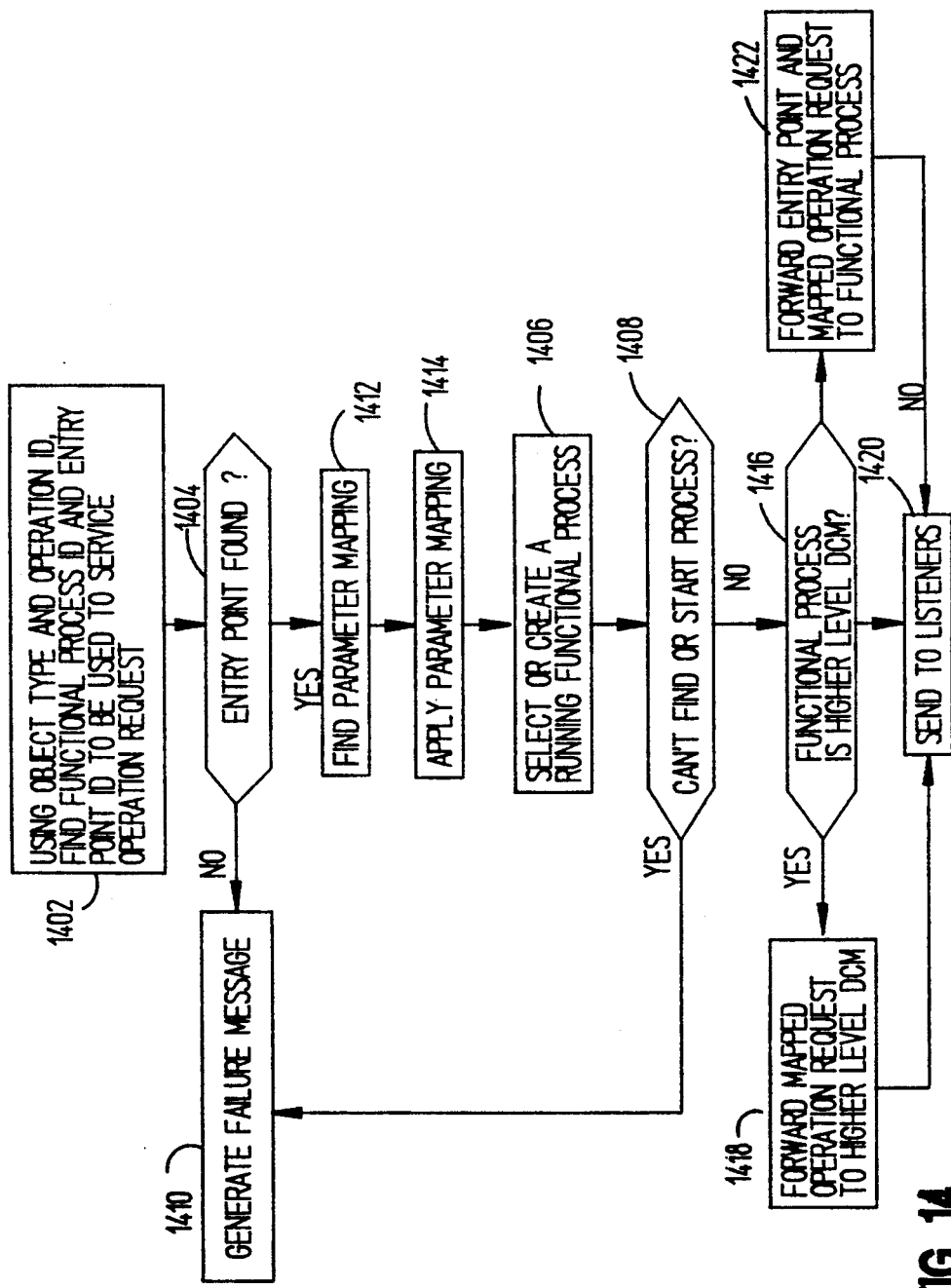
FIG. 14 is a flow diagram for forwarding an operation request to a servicing functional process.

A more detailed description of embodiments of block 1304 is shown with regard to FIG. 14.

Referring now to FIG. 14, the first step in forwarding the operation request (which, as discussed above, is a type of event message) to the target functional process is to determine the functional process ID and entry point ID to service the operation request using the Object Type and operation ID from the event message. This is indicated by a block 1402.

Note that this entry point ID will be different from the one that was received by the DCM as discussed above with regard to FIGS. 11 and 12. That Entry Point ID was for an entry point in the environment in which the receiving DCM resides. The one discussed here concerns an entry point for the environment of a lower level DCM or for a functional process.

The Object Type discussed above is simply the type of object that the functional process will be manipulating, and the Operation ID indicates the type of operation being requested. Embodiments of the present invention contemplate that the Object Type and Object ID are part of the event message and are generated by the requesting functional process. In general, the constituents of the Event Message as contemplated by embodiments of the present invention are discussed with regard to FIG. 19 further below.

Still referring to FIG. 14, if the Entry Point ID with which to service the operation is not found, then an error message will be generated, as indicated by a decision block 1404 and block 1410. If, however, the relevant entry point ID is found, then the Parameter Mapping will be found and applied, as indicated by a block 1412 and a block 1414. The parameter mapping provides the same function as the Conversion Instructions regarding FIG. 12 and process 1202, except that it is done at a different point in the DCM mechanism. This will be explained further below. In any event, the operation request is then said to be "mapped."

The present invention will then select or create a running functional process, as indicated by a block 1406. That is, if an instance of the functional process is running, then rather than start a new one, it will select one of the running functional processes. In this way, a functional process can be utilized without having to begin a new one by retrieving it from the storage device 110, as discussed above. Of course, if none are running, then a functional process will have to be started.

If a functional process cannot be found or started, then, again, a failure message will be generated, as indicated by a decision block 1408 and block 1410. If a functional process has been found or started, then the next step is to determine whether or not the functional process which is to receive the operation request is a parent composite, as indicated by a decision block 1416. In other words, a determination must be made as to whether the operation request goes to a higher level DCM. If it does not, then the entry point ID and "mapped" operation request are forwarded directly to the target functional process, as indicated by a block 1422.

Since the operation request (which is an event message) and the entry point ID are forwarded together, they comprise an Entry Request, as discussed above. Thus, the event message can be thought of as being re-converted into an Entry Request. As discussed above, an Entry Request is what is sent from a DCM to a lower level DCM or functional process.

If, however, the target functional process is in a different environment (and thus the "forwarding" DCM must send the operation request to a higher level DCM) then the "mapped" operation request is sent to the higher level "parent" DCM without an Entry Point ID, as indicated by a block 1418. Operation requests are sent to a higher level DCM because it is logical for the higher level DCM to determine what functional process (within some environment) should handle the request. This allows the lower level DCM (i.e. the environment) to act as a simple component (e.g. as a functional process) of the higher level DCM. Otherwise, each DCM would require knowledge (or access to the knowledge) of all the functional processes of the environment system.

Once the operation request has been forwarded to the functional process responsible for servicing the request, the operation request is broadcast to any "listeners" who want to know that this operation took place. This is indicated by a block 1420.

The data flow diagram corresponding to FIG. 14 is shown in FIG. 15a. Referring to FIG. 15a, embodiments of the present invention contemplate v receiving an operation request, and extracting the operation ID and the object type. This is indicated by process 1502. Using these two pieces of information, the appropriate functional process to service the operation is determined using the binding table 708, as indicated by a process 1504. Specifically, an Entry Point ID and Functional Process ID are generated. Again, the Functional Process ID is an ID that represents the specific type of functional process to be used (e.g. Lotus 123).

With regard to the precise parameters within the operation request which are sent to the selected functional process, the Parameter Conversion Mapping Table 710 is used to find the parameter mapping and to subsequently apply that mapping, as indicated by processes 1508 and 1510. Thus, as discussed above regarding FIG. 14, the operation request and parameter mapping are combined in order to create a "mapped" operation request. The Operation request is then sent to its destination as indicated by block 1518. The next step is to select or create a running functional process, as indicated by process 1506.

In process 1506, a specific running instance of the functional process to receive the operation request is selected. This is done using the Entry Point ID and Functional process ID generated from process 1504, and the operation request as generated from process 1510 (discussed further below).

Regarding process 1506, the Functional Process ID to Instance ID table 1514 keeps track of all running functional processes (i.e. instances), and is thus used to determine if any running functional processes exist. If more than one functional process is running, then a process selection criteria table is used, as indicated by data store 1516. If, however, one needs to be started up, then functional process start-up information is used, as indicated by a data store 704. The Functional Process ID to Instance ID table 1514 is consequently updated.

The Instance ID represents a specific instance of a functional process. Once an instance is selected as indicated above, it is sent to block 1518. This block indicates that the information is sent either to the higher level "parent" DCM, or to a functional process or lower level DCM. Also sent to block 1518 is an Entry Point ID generated from process 1504.

Figure 15B:
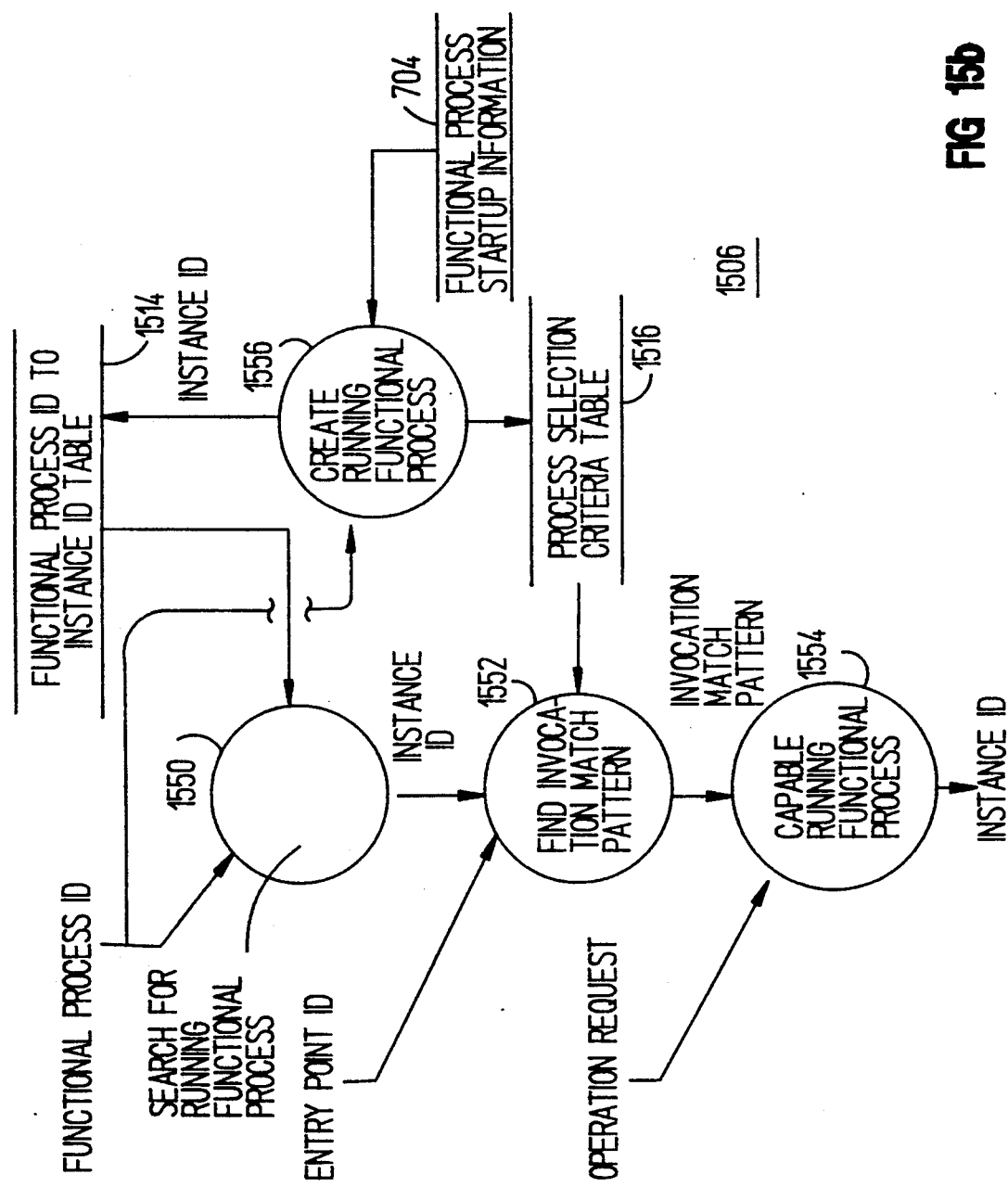
FIG. 15b is a data flow diagram for selecting or creating a running functional process.

A more detailed description of process 1506 as contemplated by embodiments of the present invention is now described with regard to FIG. 15b. Referring now to FIG. 15b, process 1550 receives the functional process ID and begins to search for a running process using a Functional Process To Instance ID table 1514. A list of running functional processes (i.e. instances) corresponding to the functional process indicated in the functional process ID is formed, and is sent to process 1552.

The purpose of process 1552 is to find an invocation match pattern. The invocation match pattern is essentially a set of instructions indicating the criteria that the operation request must fulfill if the running functional process is to service the operation request. These instructions are determined based upon information in the Process Selection Criteria 1516 and the Entry Point ID.

Once generated, the invocation match pattern is then sent to process 1554, which in conjunction with an operation request, decides whether the criteria of this particular running functional process (i.e., this instance) has been fulfilled by the operation request. If it can, then the instance ID for that running functional process is generated, and the operation request is processed by that instance. In embodiments contemplated by the present invention, the criteria are fulfilled when the value of certain fields in the operation request match those required by the running functional process.

As an example of the mechanism described above, assume that a running functional process of a word processing program is presently editing a document call the "Jones Contract." Let us assume, then, that an operation request is received to delete a paragraph in the Jones Contract. The functional process ID received by process 1550 would correspond to the word processing program used to edit the contract, and thus the present invention would searches for "running" word processing programs.

A list of running word processing programs is given to process 1552, which receives the entry point ID. In this particular case, the entry point ID would correspond to the deletion of paragraph. Each of the instances is checked using the Process Selection Criteria Table 1516 to see what their criteria would be. For example, the instance we are seeking might have the criteria that it will only accept event messages in which the object ID is "the Jones Contract."

For each of the instances, the operation request being processed is matched against the criteria of the instances. In this example, if the operation request contains an object ID which specifies "the Jones Contract," then process 1554 will select the appropriate instance ID for the word processing program which is presently running the Jones Contract.

If, however, an appropriate running functional process does not exist, then one will be created, as indicated by a process 1556. Functional process start-up information 704 will be used, and the functional process instance ID table 1514 will be updated. In addition, the process selection criteria 1516 will be updated to reflect the newly created functional process.

It should be understood that the example above is merely to demonstrate the embodiments described, and should not be interpreted in any way as being limiting. For example, in addition to the object ID, the criteria used to determine whether a running functional process is to be chosen to process an operation request could have been decided based upon the parameters of the event message. In addition, any one or a combination of fields (a preferred embodiment of which is described below with regard to FIG. 19) could have been chosen as criteria.

The embodiments described above are particularly advantageous since the needed information is all contained in the operation request. Otherwise, information such as that pertaining to the object ID would have to be obtained from some common repository elsewhere in the environment system. In this case, the entry point ID and functional process ID are obtainable using the operation request to index the Binding Table 708. These IDs are then used with the process selection criteria 1516 to get the invocation match pattern instructions. These instructions are then used with the operation request in process 1554 to obtain the appropriate instance ID. This shows that no reference to a common repository to obtain the properties of the operation request or the object to be operated on are necessary.

Referring back to FIG. 15a, when the operation request is finally sent to its appropriate location as indicated by block 1518, it is sent via a data pack over a socket. In embodiments of the present invention, it is contemplated that the Instance ID is a numerical identifier for the selected running functional process.

FIG. 16 represents the steps taken by the functional process itself (i.e. not by a DCM) when receiving an event message. Thus, this figure is from the perspective of a functional process as contemplated by embodiments of the present invention rather than from a DCM.

Referring now to FIG. 16, embodiments of the present invention contemplate that each functional process periodically "listens" on the socket which attaches it to the appropriate DCM, as indicated by a block 1602. More specifically, a functional process will continually poll the DCM to see if there are any event messages for it. This is true even while the functional process is running. In this way, a functional process can receive requests while executing.

If, after polling, no event message is received, then the functional process relinquishes control until it decides to poll the DCM again. This is indicated by a decision block 1604 and a block 1618. If however an event message is received, then the event message is read and stored for subsequent use by the functional process, as indicated by a block 1606. If the transmission has not been completed (that is, all of the information has not yet been sent) then control will be relinquished so that the remaining portions of the event message can be sent, as indicated by a decision block 1608 and block 1618.

Once the entire event message has been received, the Entry Point ID is used to locate the proper function within the functional process to execute, as indicated by a block 1610. If the relevant function is not found, then an error message is sent to the DCM, as indicated by a block 1616. If, however, the proper function is found, then it is executed, as indicated by a block 1614. Once executed, the results of the execution are sent to the DCM associated with the target functional process for forwarding to the DCM associated with the requesting functional process, as indicated by a block 1615.

Figure 17:
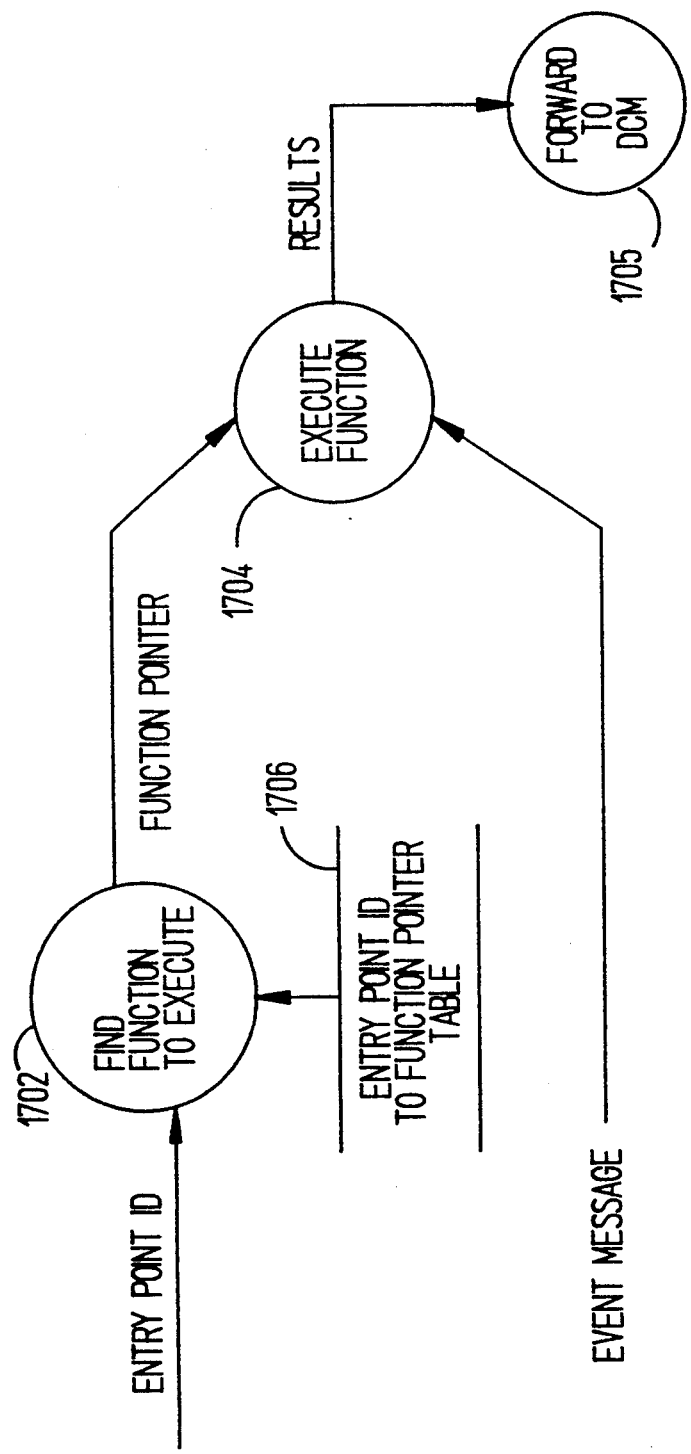
FIG. 17 is a data flow diagram showing the action a functional process takes upon receipt of an event message as contemplated by embodiments of the present invention.

FIG. 17 shows a data flow diagram corresponding to FIG. 16. Referring now to FIG. 17, a functional process receives both an Entry Point ID and an event message. The Entry Point ID is used to index the Entry Point ID to function pointer table 1706 via process 1702 to find a function pointer. As indicated by process 1702, this function pointer is used to find the precise portion of the functional process to execute the function. Thus, the function pointer contains the precise address for the function to be performed within the functional process. The function pointer and event message are then used together to execute the relevant function, as indicated by process 1704. The results are then forwarded to the appropriate DCM, as indicated by process 1705.

In embodiments of the present invention, the flowchart of FIG. 16 and data flow diagram of FIG. 17 are indicative of the type of code to be inserted within a typical functional process in order to make it operate with the present invention. However, other types of code are also contemplated.

Figure 18:
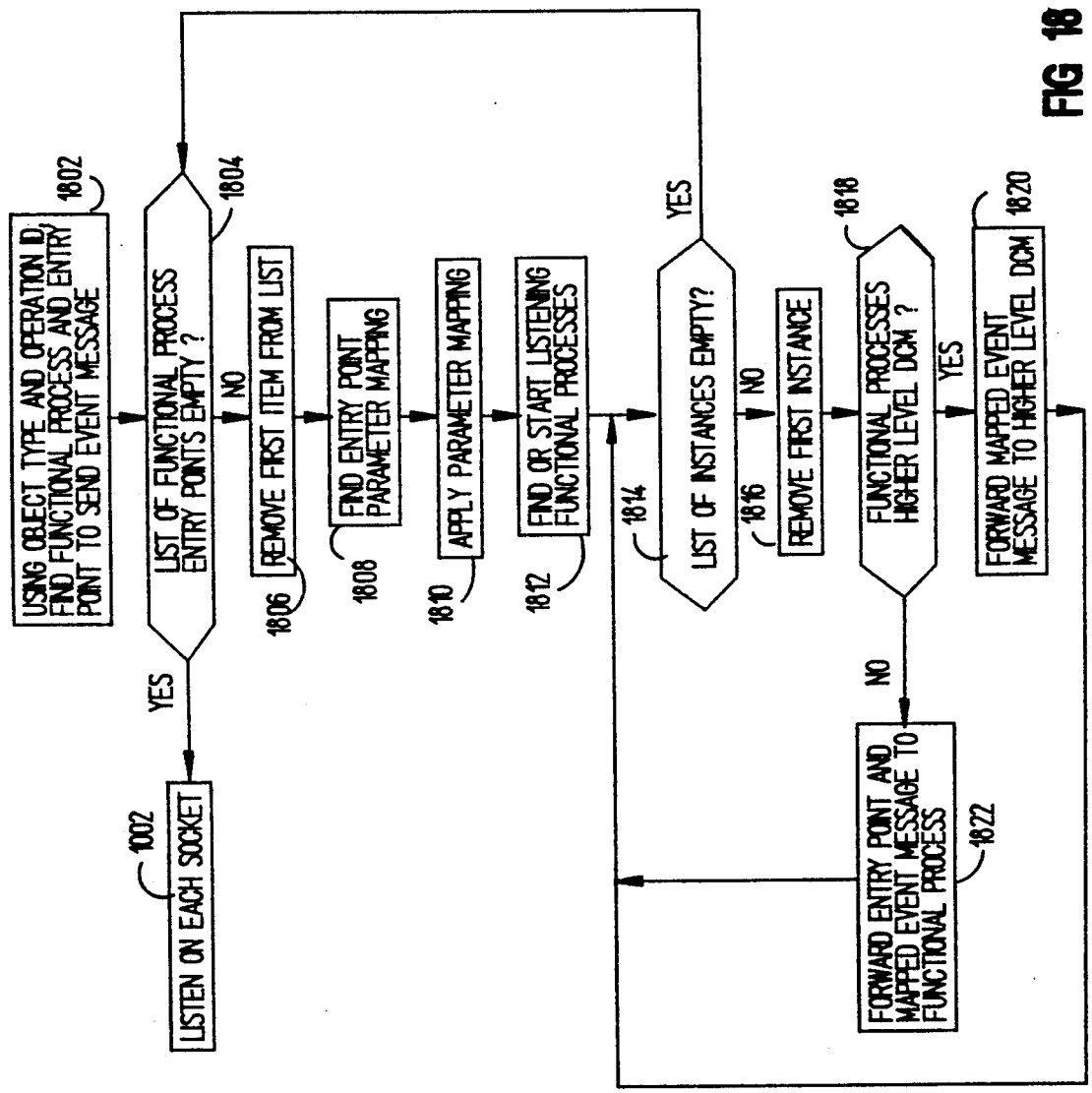
FIG. 18 is a flow diagram for forwarding events to listening functional process.

FIG. 18 shows how the DCM sends events (other than operation requests) to the various functional processes that want to know whether a specific event took place. Referring now to FIG. 18, this figure is essentially equivalent to the "operation request" flowchart shown in FIG. 14. Referring now to FIG. 18, the functional processes that wish to be notified of certain events are determined using the object type and operation ID, as indicated by a block 1802. The functional processes that are "determined" as indicated above are then formed into a list. As each event announcements forwarded to the appropriate functional process, it is taken off this list.

The next step is to determine whether or not all of the functional process entry points on the list have been sent an event. This will be indicated if the list of functional process entry points was empty, as indicated by a decision block 1804. If it is, then the DCM will go back to listening on each socket, as indicated by block 1002.

However, if there are still more functional processes on the list, then the first item on the list is removed, as indicated by a block 1806. The Parameter Mapping is found and applied, as indicated by blocks 1808 and 1810. This is done in the same way as blocks 1412 and 1414 as discussed regarding FIG. 14 above.

The next step is to find or start "listening" functional processes (i.e. instances that wish to listen). This is analogous to block 1406 in FIG. 14. The difference, however, is that only one instance of a functional process is assigned to service a request, but many instances may listen to an event. For this reason, a list of instances is passed to block 1814.

If the list of instances is empty, then the flow goes to block 1804. If the list is not empty, the first instance is then removed as indicated by block 1816, and a determination is made as to whether the functional process (from which the instance is derived) is a parent composite (having a higher level DCM), as indicated by a block 1818. If the answer is "yes," the next step is to forward the "mapped" event message to the higher level DCM or "parent," as indicated by a block 1820. (Embodiments of the present invention contemplate that this is done in the same way as discussed for operation requests in block 1418 discussed above) If the answer is "no" then the step of block 1822 is executed (which is again contemplated as being done in the same way as block 1422 discussed above). This cycle continues until the list of instances is empty.

Figure 19:
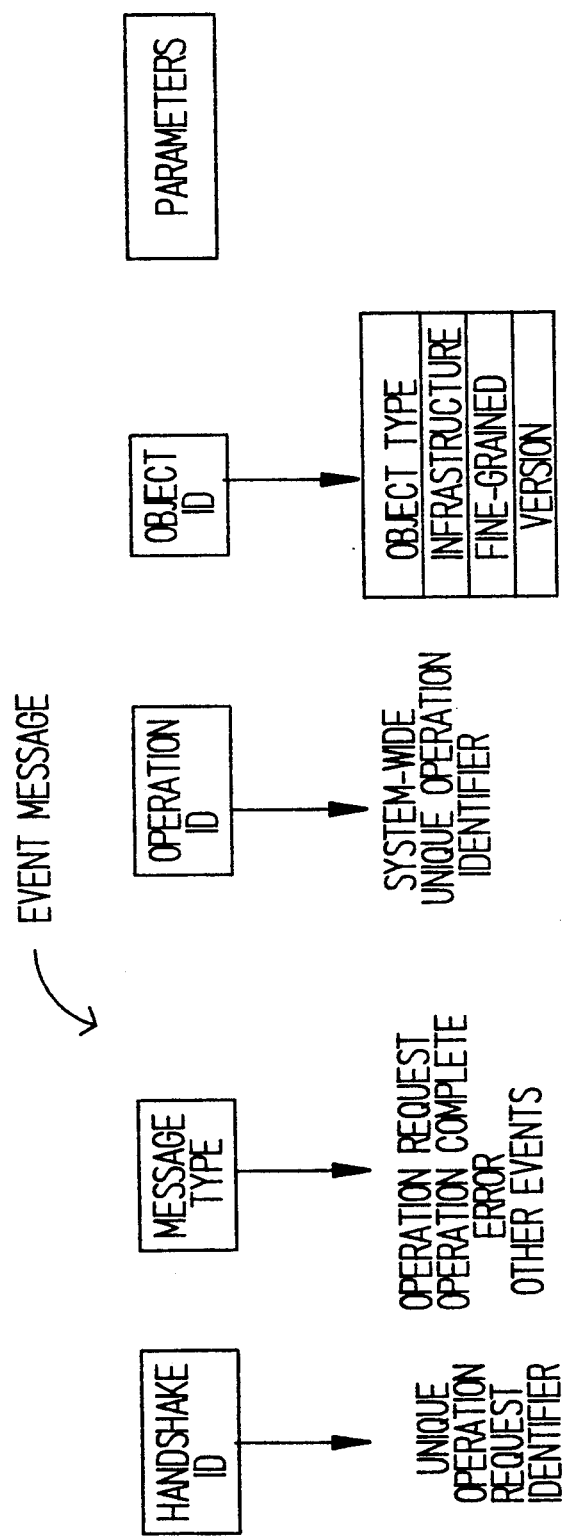
FIG. 19 shows the constituents of an event message as contemplated by embodiments of the present invention.

In embodiments of the present invention, the event messages are data packets having a particular form. While the present invention contemplates any number of different forms, one form contemplated by various embodiments of the present invention is discussed regarding FIG. 19. Referring now to FIG. 19, the event message is shown to comprise several fields. The first field is a handshake ID which is used to give each operation request a specific unique system-wide ID. This is done so that the success or failure of an event can be properly associated with the original operation request.

The next field, which is the "message type," simply states the type of message which is being transferred. In preferred embodiments of the present invention, such messages include operation requests, operation complete, error messages and other events.

The next field is an operation ID which, in preferred embodiments of the present invention, is a system-wide (i.e. consistent throughout the environment system) unique operation identifier. The operation ID indicates the semantics of the operation (e.g. "PRINT"). In embodiments of the present invention, an event message with a given operation ID always contains the same number and type of parameters.

The next field is an object ID. This indicates the object upon which the operation will be performed, for example, spreadsheet X. The object ID contains several pieces of information. The Object Type is used in finding the functional process which will service the operation, as was discussed above. The remainder of the fields can be used by the requesting functional process to locate data associated with the object. For example, the "infrastructure" can indicate a specific path to the structure, the "fine grain" portion might indicate which paragraph to perform the operation on and the "version" portion might indicate which version of the object (if there are several) to perform the requested operation on. It should be understood at this is only an example and that other levels of granularity can be used as well.

The last field represents the parameters which would be sent with the event/operation message. These parameters should correspond to whatever parameters are necessary for the target functional process to perform the requested operation.

It should be understood that present invention is not limited to the embodiments indicated above, and that the examples presented above are merely for the purposes of illustration. The scope of the present invention should therefore be interpreted by the following claims as defined by the forgoing figures and text.

What is claimed is:

1. A method for the selection of instances of functional processes within an object-oriented computer environment system, data communications within said object-oriented environment being controlled by a communications manager, said object-oriented environment comprising first and second functional processes, said first process performing one or more services, said second process sending an operation request, said method performed by a computer sub-system and comprising the steps of:
   (1) requesting an operation to be performed by said first functional process, said operation request being initiated by said second functional process and containing one or more specified fields;
   (2) extracting an Operation ID and an object type from said operation request;
   (3) binding said operation request to said first functional process using a binding table, wherein the Operation ID and object type extracted from said operation request are used to index said binding table;
   (4) creating and maintaining a list of instances of said first functional process in a function process ID to instance ID table;
   (5) creating and maintaining a process selection criteria table containing criteria corresponding to each instance in said list of instances, and
   (6) permitting an instance in said list of instances to service said operation request only if the value of one or more specified fields in said operation request matches said criteria for said instance in said list of instances.

2. The method of claim 1, wherein said step (3) comprises the step of indicating that said first functional process should perform a first operation to an object, and of indicating that a second functional process should perform a second operation to said object.

3. The method of claim 1, wherein said step (6) comprises the step of selecting an instance ID when said value of said one or more specified fields in said operation request matches said criteria for said instance in said list of instances.

4. A method for the selection of instances of functional processes within an object-oriented computer environment system, data communications within said object-oriented environment being controlled by a communications manager, said object-oriented environment comprising first and second functional processes, said first process performing one or more services, said second process sending an operation request, said method performed by a computer sub-system and comprising the steps of:
   (1) requesting an operation to be performed by said first functional process, said operation request being initiated by said second functional process and containing one or more specified fields;
   (2) extracting an Operation ID and an object type from said operation request;
   (3) binding said operation request to said first functional process using a binding table, wherein the Operation ID and object type extracted from said operation request are used to index said binding table;
   (4) creating and maintaining a list of instances of said first functional process in a function process ID to instance ID table;
   (5) creating and maintaining a process selection criteria table containing criteria corresponding to each instance in said list of instances;
   (6) permitting an instance in said list of instances to service said operation request only if the value of one or more specified fields in said operation request matches said criteria for said instance in said list of instances; and
   (7) creating a new instance of said first functional process when the criteria for none of said instances in said list of instances are met.

5. A computer sub-system for the selection of instances of functional processes within an object-oriented computer environment system, comprising:
   an environment constructor for creating an object-oriented environment, said object-oriented environment comprising a first functional process for performing one or more services, wherein said first functional process provides a description to said object-oriented environment of services it can provide to a second functional process;

a communications manager for said object-oriented environment, provided by said environment constructor, wherein said communications manager controls the communication of said first and second functional process within said object-oriented environment, and allows said second functional process to send an operation request, requesting that an operation be performed;

a binding table, contained in said communications manager, for using an Operation ID and an object type to indicate that said first functional process should perform said operation request received by said communications manager;

a Functional Process ID to Instance ID table, contained in said communications manager, for maintaining a list of instances of said first functional process; and a process selection criteria table containing criteria corresponding to each instance in said list of instances, wherein an instance in said list of instances will service said operation request only if the value of one or more specified fields in said operation request matches said criteria for said instance in said list of instances, wherein said operation request contains information to determined whether said criteria are met and wherein a new instance of said first functional process is created when the criteria for none of said instances in said list of instances are met.

6. The method of claim 4, wherein said step (6) comprises the step of selecting an instance ID when said value of said one or more specified fields in said operation request matches said criteria for said instance in said list of instances.

* * * * *